US012756335B2

(12) United States Patent
Schulenberg et al.

(10) Patent No.: US 12,756,335 B2
(45) Date of Patent: Oct. 6, 2026

(54) MOTOR CONTROLLER MODULE

(71) Applicant: Briggs & Stratton, LLC, Wauwatosa, WI (US)

(72) Inventors: David Schulenberg, Wauwatosa, WI (US); Jacob Schmalz, Wauwatosa, WI (US)

(73) Assignee: BRIGGS & STRATTON, LLC, Wauwatosa, WI (US)

( * ) Notice: Subject to any disclaimer, the term of this patent is extended or adjusted under 35 U.S.C. 154(b) by 374 days.

(21) Appl. No.: 18/243,998

(22) Filed: Sep. 8, 2023

(65) Prior Publication Data

US 2024/0007026 A1 Jan. 4, 2024

Related U.S. Application Data

(63) Continuation of application No. 17/888,813, filed on Aug. 16, 2022, now abandoned, which is a continuation of application No. 16/512,303, filed on Jul. 15, 2019, now Pat. No. 11,437,936.

(60) Provisional application No. 62/698,529, filed on Jul. 16, 2018.

(51) Int. Cl.

| | |
|---|---|
| ***H02P 5/52*** | (2016.01) |
| ***G05B 19/418*** | (2006.01) |
| ***H02P 4/00*** | (2006.01) |
| ***H02P 6/14*** | (2016.01) |
| ***H02P 6/20*** | (2016.01) |

(52) U.S. Cl.

CPC ............ *H02P 5/52* (2013.01); *G05B 19/4185* (2013.01); *H02P 4/00* (2013.01); *H02P 6/14* (2013.01); *H02P 6/20* (2013.01)

(58) Field of Classification Search

CPC ...... H02P 5/52; H02P 4/00; H02P 6/14; H02P 5/46; H02P 5/00; G05B 19/4185

See application file for complete search history.

(56) References Cited

U.S. PATENT DOCUMENTS

| | | | |
|---|---|---|---|
| 5,402,626 | A | 4/1995 | Zinck |
| 5,497,604 | A | 3/1996 | Lonn |
| 5,502,957 | A | 4/1996 | Robertson |
| 5,934,051 | A | 8/1999 | Hahn |
| 6,230,089 | B1 | 5/2001 | Lonn et al. |
| 6,591,593 | B1 | 7/2003 | Brandon et al. |
| 6,688,090 | B2 | 2/2004 | Velke et al. |
| 6,750,622 | B2 | 6/2004 | Simizu et al. |
| 8,209,693 | B2 | 6/2012 | Matsuo |
| 8,234,026 | B2 | 7/2012 | Wyatt et al. |

(Continued)

FOREIGN PATENT DOCUMENTS

| | | |
|---|---|---|
| DE | 41 37 162 A1 | 5/1993 |
| WO | WO-2016/002081 | 1/2016 |

(Continued)

*Primary Examiner* — Bickey Dhakal

(74) *Attorney, Agent, or Firm* — Foley & Lardner LLP

(57) ABSTRACT

A controller module includes an enclosure including an inner wall defining a volume, a plurality of motor controllers, each motor controller comprising a printed circuit board (PCB) having a first side and a second side opposite the first side, a plurality of transistors located on the first side, and a plurality of outputs located on the second side. The first side of the PCB is positioned adjacent to the inner wall of the enclosure to allow heat generated by the motor controller to dissipate via the enclosure.

8 Claims, 18 Drawing Sheets

(56) References Cited

U.S. PATENT DOCUMENTS

| | | | |
|---|---|---|---|
| 8,240,414 B2 | 8/2012 | Sasahara et al. | |
| 8,657,041 B2 | 2/2014 | Ishii et al. | |
| 8,668,036 B2 | 3/2014 | Wyatt et al. | |
| 8,668,043 B2 | 3/2014 | Yang et al. | |
| 8,966,870 B2 | 3/2015 | Mackinnon et al. | |
| 9,210,839 B2 | 12/2015 | Schygge et al. | |
| 9,282,695 B2 | 3/2016 | Goto | |
| 9,313,948 B2 | 4/2016 | Moriguchi et al. | |
| 9,380,741 B2 | 7/2016 | Drew et al. | |
| 9,699,965 B2 | 7/2017 | Schygge et al. | |
| 9,840,143 B1 | 12/2017 | Keller et al. | |
| 9,950,621 B2 | 4/2018 | Dwyer | |
| 9,980,434 B1 | 5/2018 | Brown | |
| 10,058,031 B1 | 8/2018 | Brown et al. | |
| 10,091,936 B2 | 10/2018 | Laurin et al. | |
| 10,093,169 B1 | 10/2018 | Keller et al. | |
| 10,292,326 B2 | 5/2019 | Tanabe et al. | |
| 10,327,392 B2 | 6/2019 | Conrad et al. | |
| 10,442,461 B2 * | 10/2019 | Kuriyagawa | B60G 17/0161 |
| 10,687,464 B2 | 6/2020 | Zeiler et al. | |
| 2005/0217230 A1 * | 10/2005 | Bucher | A01D 75/28 56/10.2 R |
| 2005/0230168 A1 | 10/2005 | Fillman et al. | |
| 2009/0065273 A1 | 3/2009 | Wyatt et al. | |
| 2009/0201650 A1 | 8/2009 | Hauser et al. | |
| 2011/0309674 A1 | 12/2011 | Kamachi | |
| 2012/0159916 A1 | 6/2012 | Ishii et al. | |
| 2012/0227368 A1 | 9/2012 | Koike et al. | |
| 2012/0260617 A1 | 10/2012 | Gilpatrick | |
| 2013/0047565 A1 | 2/2013 | Shida et al. | |
| 2013/0110351 A1 | 5/2013 | Stone et al. | |
| 2013/0173117 A1 | 7/2013 | Bertsch et al. | |
| 2013/0268165 A1 | 10/2013 | Hashima et al. | |
| 2014/0165524 A1 | 6/2014 | Schygge et al. | |
| 2015/0006025 A1 | 1/2015 | Rhoades et al. | |
| 2015/0214864 A1 | 7/2015 | Sopko | |
| 2016/0083073 A1 | 3/2016 | Beckman | |
| 2016/0183451 A1 | 6/2016 | Conrad et al. | |
| 2018/0192580 A1 | 7/2018 | Zeiler et al. | |
| 2018/0235149 A1 | 8/2018 | Ito et al. | |
| 2018/0244310 A1 * | 8/2018 | Pursifull | B62D 15/021 |
| 2018/0249630 A1 | 9/2018 | Mullet et al. | |
| 2018/0281547 A1 * | 10/2018 | Koumura | B60G 17/018 |
| 2018/0310471 A1 | 11/2018 | Pellenc | |
| 2018/0338417 A1 | 11/2018 | Matsuda et al. | |
| 2019/0230850 A1 | 8/2019 | Johnson et al. | |
| 2019/0269067 A1 | 9/2019 | Fukano et al. | |
| 2020/0163275 A1 | 5/2020 | Zhao et al. | |
| 2020/0353977 A1 | 11/2020 | Davies et al. | |
| 2020/0363796 A1 | 11/2020 | Muro et al. | |

FOREIGN PATENT DOCUMENTS

| | | |
|---|---|---|
| WO | WO-2017/109319 A1 | 6/2017 |
| WO | WO-2017/222368 A1 | 12/2017 |

* cited by examiner

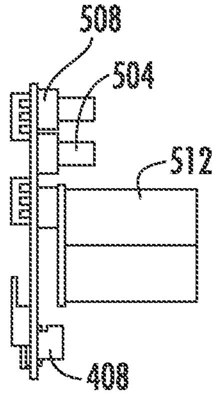
FIG. 6
FIG. 7
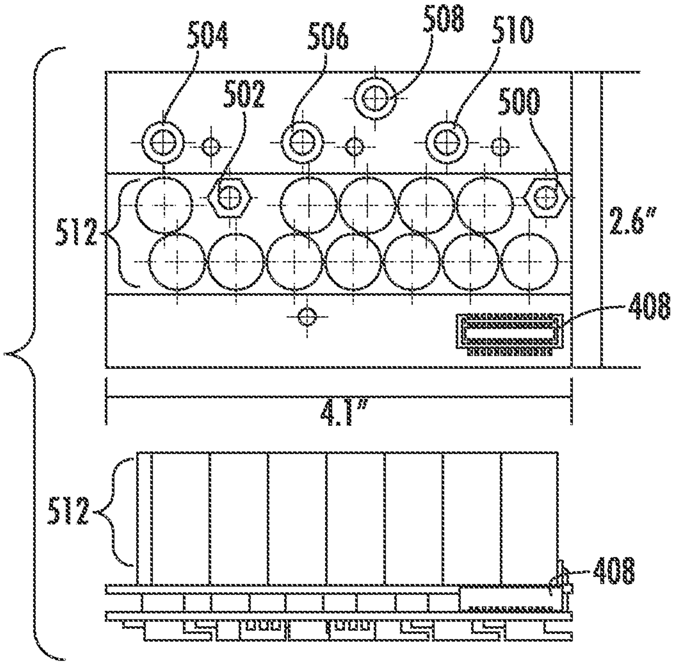
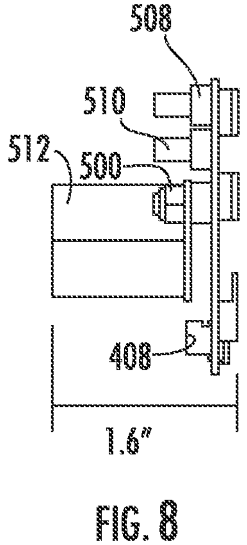
FIG. 8
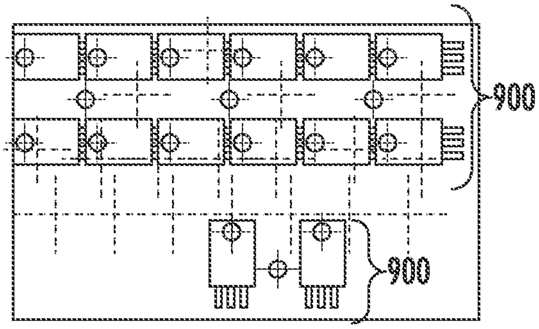
FIG. 9

MOTOR CONTROLLER MODULE

CROSS-REFERENCE TO RELATED PATENT APPLICATIONS

This Application is a continuation of U.S. patent application Ser. No. 17/888,813, filed Aug. 16, 2022, which is a continuation of U.S. patent application Ser. No. 16/512,303, filed Jul. 15, 2019, which claims the benefit of U.S. Provisional Application No. 62/698,529, filed Jul. 16, 2018, all of which are hereby incorporated herein by reference in their entireties.

BACKGROUND

The present application relates generally to outdoor power equipment. Conventionally, outdoor power equipment is powered solely via gas. The present application relates more particularly to electric outdoor power equipment. Electric outdoor power equipment may be battery powered, where a battery is configured to power a motor of the outdoor power equipment. In a conventional system, if there are multiple motor controllers, the motor controllers do not have information regarding how other motors of the electric outdoor power equipment are operating.

SUMMARY

One embodiment of the present disclosure relates to outdoor power equipment including a drive motor configured to operate a drive wheel, a drive motor controller configured to control the drive motor, a first chore motor configured to drive a first chore device, and a first chore motor controller communicatively coupled to the drive motor controller. The first chore motor controller is configured to receive an operational state of the drive motor including a drive motor speed from the drive motor controller and operate the first chore motor based on the operational state of the drive motor.

Another embodiment of the present disclosure relates to outdoor power equipment including a left drive motor configured to operate a left drive wheel on a left side of the outdoor power equipment, a right drive motor configured to operate a right drive wheel on a right side of the outdoor power equipment, a sensor configured to detect an incline of a surface over which the outdoor power equipment is travelling, and at least one drive motor controller communicatively coupled to the sensor and configured to control the left drive motor and the right drive motor, The at least one drive motor controller is configured to receive the detected incline from the sensor, determine a roll angle of the outdoor power equipment based on the detected incline, and operate the left drive motor at a left drive speed and the right drive motor at a right drive speed based on the roll angle.

Another embodiment of the present disclosure relates to a controller module including an enclosure including an inner wall defining a volume, multiple motor controllers, each motor controller including a printed circuit board (PCB) having a first side and a second side opposite the first side, multiple transistors located on the first side, and multiple outputs located on the second side. The first side of the PCB is positioned adjacent to the inner wall of the enclosure to allow heat generated by the motor controller to dissipate via the enclosure.

Another embodiment of the present disclosure relates to a control system including a first drive motor controller configured to control a drive motor speed of a drive motor and a first chore motor controller communicatively coupled to the first drive motor controller. The first chore motor is configured to receive an operational state of the drive motor including the drive motor speed from the first drive motor controller and operate a first chore motor based on the operational state of the drive motor, the first chore motor configured to drive a first chore device.

Another embodiment of the present disclosure relates to a chore motor controller configured to be coupled to a drive motor controller. The chore motor controller includes a processing circuit comprising a processor and a memory. The memory stores instructions that, upon execution by the processor, cause the processor to receive an operational state of a drive motor including a drive motor speed from the drive motor controller and operate a chore motor based on the operational state of the drive motor, the chore motor configured to drive a chore device It is to be understood that both the foregoing general description and the following detailed description are exemplary and explanatory only, and are not restrictive of the invention as claimed.

BRIEF DESCRIPTION OF THE DRAWINGS

The disclosure will become more fully understood from the following detailed description when taken in conjunction with the accompanying figures.

FIG. 6-9 are diagrams illustrating side perspectives, a top perspective, a front perspective, and a bottom perspective of the motor controller of FIG. 5, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
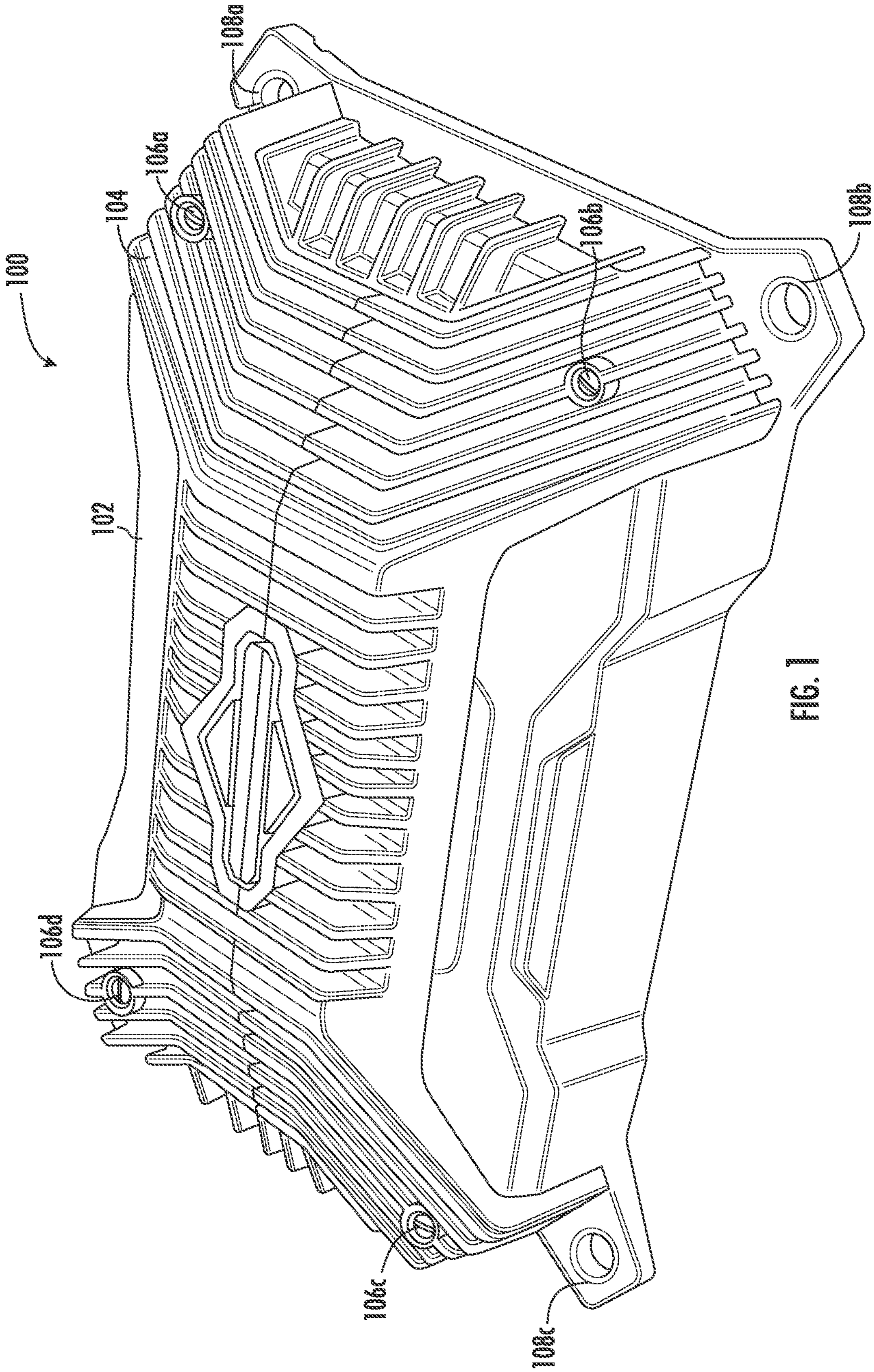
FIG. 1 is a diagram of a motor controller module for outdoor power equipment that includes multiple motor controllers, according to an exemplary embodiment.

Referring now to FIG. 1, a motor controller module 100 is shown, according to an exemplary embodiment. The motor controller module 100 includes an enclosure including one or multiple motor controllers for controlling electric motors of a piece of outdoor power equipment or other equipment suitable to be powered by electric motors. In different embodiments, the motor controller module 100 can be aluminum, plastic, steel, fiberglass, polycarbonate, polyester, etc. In some embodiments, the motor controller module 100 may be a specific thickness of aluminum (have a specific thermal mass) such that heat generated within the motor controller module 100 can be dissipated (e.g., via conduction of the aluminum). The motor controller module 100 can be implemented in various types of outdoor power equipment, for example, a zero turn radius (ZTR) machine (e.g., a sitting ZTR or a standing ZTR lawnmower, spreader, etc.), a tractor (e.g., a tractor lawn mower, a backhoe, etc.), an air compressor, a posthole digger or a machine with a posthole digger attachment, commercial construction equipment, recreational vehicles, utility vehicles, golf carts, aerial lifts, floor cleaning equipment, industrial utility vehicles, etc. The motor controller module 100 is shown to include an enclosure 102 and a heatsink 104. The enclosure 102 may be connected to the heatsink 104 and fastened together via connections 106*a*-106*d* which may be holes for bolts, screws, and/or any other type of connector. The motor controller module 100 can include, or can be mounted to, a base plate. The base plate may be an aluminum component which the motor controller module 100 can be attached to via the connections 106*a*-106*d*. The base plate may be aluminum, steel, etc.

The heatsink 104 can dissipate heat for one or multiple controllers included within the motor controller module 100. The controllers can be configured to control a motor of the outdoor power equipment. For example, the controllers of the motor controller module 100 can be configured to operate a drive motor. The drive motor can be configured to operate a drive wheel of the outdoor power equipment. Furthermore, the controllers of the motor controller module 100 can be configured to operate a chore motor. A chore motor can be a motor that performs a task of the outdoor power equipment. For example, for a lawnmower, a chore motor can be a motor that drives a grass cutting blade of the lawn mower. For a spreader, the chore motor can be a motor that operates a distributor that distributes particles (e.g., fertilizer, seeds, salt, etc.).

In some embodiments, the motor controller module 100 is located near a motor (or other element or component) that the motor controller module 100 is operating (reducing susceptibility due to shorter signal lines) and may only require motor connections, power connections, and/or CAN connections. This distance and/or few number of required connections can decrease electromagnetic interference (EMI), improving electromagnetic compatibility (EMC). If the motor controller module 100 operates to control a drive motor, the motor controller module 100 may be located near the drive motor or mounted on a battery that provides the drive motor with energy. In some embodiments, the motor controller module 100 is connected directly to multiple battery cells (via a controller board of the motor controller module 100) for operating motors.

Similarly, if the motor controller module 100 operates to control a chore motor, the motor controller module 100 can be located near the chore motor or mounted on a battery that provides the chore motor with energy (e.g., electrical energy). In some embodiments, the motor controller module 100 is located on or under a chassis of the outdoor power equipment. In some embodiments, the motor controller module 100 can be located on a deck of outdoor power equipment (e.g., a shroud that encloses lawn mower blades). The motor controller module 100 can perform load based control of lawn mower speeds, perform anti-scrubbing, can identify the size of the deck and optimizing cutting speed based on the width of the identified deck, and various other features.

In FIG. 1, bosses 108*a*-108*c* are shown for mounting the motor controller module 100 onto outdoor power equipment (e.g., connecting to a base plate of the outdoor power equipment). Although three bosses are shown, the motor controller module 100 can include any number of bosses (e.g., two, four, etc.). Although not shown in FIG. 1, in some embodiments, the bosses 108*a*-108*c* are elevated. Elevating the bosses 108*a*-108*c* can allow the motor controller module 100 to be sunk into another surface. For example, rather than being connected onto the top of a deck of outdoor power equipment, the motor controller module 100 can be sunk into the deck fully and/or partially via elevated bosses 108*a*-108*c*.

The motor controller module 100 can be water tight and/or dust tight. This can prevent any electronic components within the motor controller module 100 (e.g., the motor controllers as described herein) from becoming damaged. Since the motor controller module 100 may be sealed, all communication between the components (e.g., controllers) of the motor controller module 100 may be internal wiring/communication bus connections. In some embodiments, when the controllers of the motor controller module 100 communicate to other external controllers, motors, and/or controller modules, a water tight and/or dust tight wiring interface can be utilized to wire the controllers of the motor controller module 100 to the external components.

Still referring to FIG. 1, although not shown, the motor controller module 100 can have a heat dissipation channel for cooling the motor controller module 100. For example, a shell or casing can surround some and/or all of the motor controller module 100 forming an air channel between the shell/casing and the motor controller module 100. This can permit air to flow around the sides of the motor controller module 100 for cooling (convection). Furthermore, the motor controller module 100 may have an opening allowing warm air to escape the motor controller module 100.

In some embodiments, the controller module 100 can include a thermal bath (e.g., a thermal water bath) which can surround some and/or part of the controller module 100 and/or components of the controller module 100 to cool the controller module 100. In some embodiments, the controller module 100 can include a liquid cooling system configured to cool controllers of the controller module 100 and dissipate heat outside the controller module 100.

Figure 2:
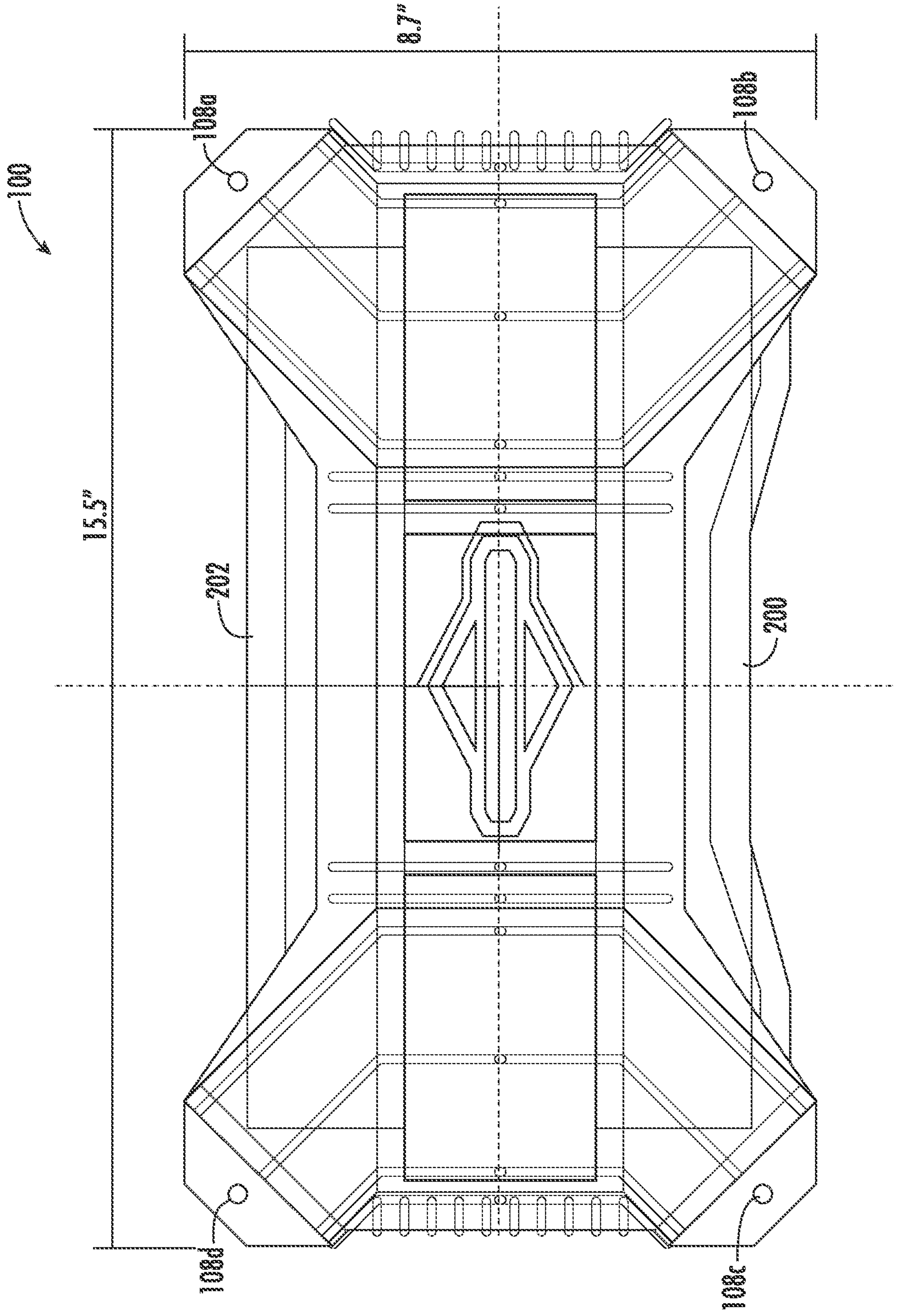
FIG. 2 is another diagram of the motor controller of FIG. 1 illustrating the dimensions of the motor controller module, according to an exemplary embodiment.

Referring now to FIG. 2, the motor controller module 100 is shown with indications of dimension, according to an exemplary embodiment. FIG. 2 illustrates the motor controller module 100 from an overhead perspective. The bosses 108*a*-108*c*, and an additional boss 108*d*, are shown in FIG. 2. In FIG. 2, the motor controller module 100 is shown to have a length of 15.5 inches and a width of 8.7 inches. However, the motor controller module 100 can be any dimensions and is not limited to the dimensions shown in FIG. 2. For example, based on the number of motor controllers contained within the controller module 100, the size of the motor controller module 100 can change, e.g., be proportional to the number of motor controllers within the controller module 100.

The motor controller module 100 is shown to include a branding panel 200. The branding panel 200 may include a sticker, ink printing, and/or etched brand labels. An input/output (I/O) panel 202 can include one or more holes and/or connectors (e.g., watertight connectors) for connecting the one or multiple controllers of the motor controller module 100 to motors, external devices, battery management systems, user input systems, etc. In some embodiments, the holes and/or connectors of the I/O panel 202 may be based on the number of controllers and/or use of the controllers of the motor controller module 100. For example, a ZTR lawn mower may have a different number controllers and/or motors than a spreader.

Figure 3:
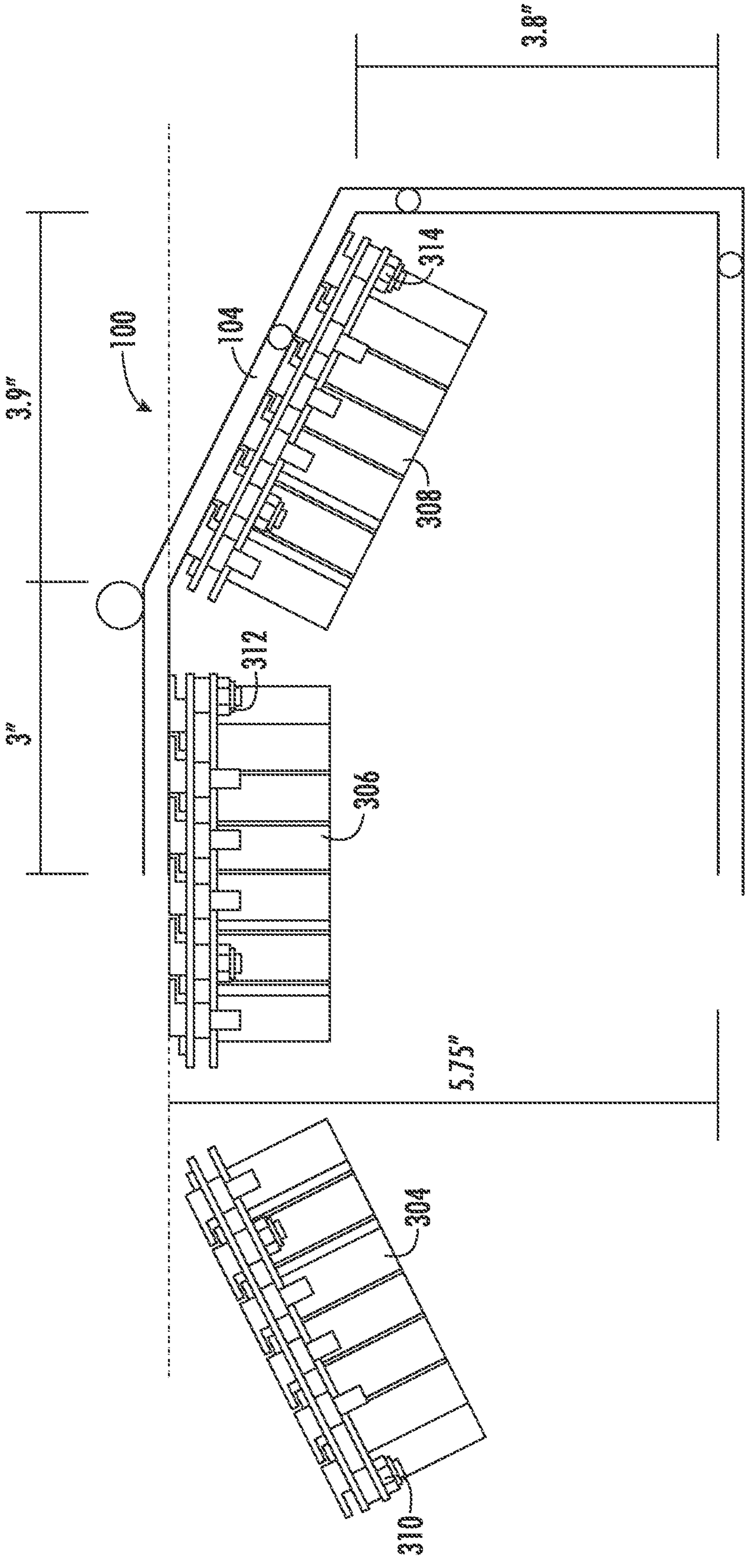
FIG. 3 is a diagram of the motor controller module of FIG. 1 shown to include the motor controllers, according to an exemplary embodiment.

Referring now to FIG. 3, the motor controller module 100 is shown to include motor controllers, according to an exemplary embodiment. In FIG. 3, the motor controller module 100 is shown from a side perspective and is shown to include a motor controller 304, a motor controller 306, and a motor controller 308. Each of the motor controllers 304-308 can be configured to operate a motor (or in some cases multiple motors), for example, a motor that drives a wheel of outdoor power equipment, a motor that drives a blade of outdoor power equipment, a motor that drives a spreader of outdoor power equipment, a motor that drives a compressor of outdoor power equipment, etc. In some embodiments, the controllers 304-308 can be configured to perform heat rejection by operating a cooling system.

The controllers 304-308 can distribute data processing for the motor controller module 100. In some embodiments, the distributed data processing occurs dynamically. In some embodiments, the distributed data processing is predefined such that each of the controllers 304-308 is setup to perform various processing operations. The distribution of data processing can be predetermined based on available inputs and outputs and processing power of each of the controllers 304-308. In some embodiments, each of the controllers 304-308 can perform all of the operations for an entire piece of outdoor power equipment. In this regard, based on user settings and/or requirements, one or multiple of the controllers 304-308 can be configured to perform processing operations for controlling the outdoor power equipment. Via the distribution of operations, features can be added to each of the controllers 304-308 since each of the controllers 304-308 are physically similar (e.g., same processor, same I/O, same memory), each of the controllers 304-308 can be programed with a variety of desired features without requiring changes to the hardware of the controllers 304-308.

The motor controller module 100 is shown to have a total height of 5.75 inches (a vertical portion height of 3.8 inches), a sloped top width of 3.9 inches, and a flat top width of 3 inches. However, the motor controller module 100 may be any dimensions. Posts of the motor controllers 304-308 (e.g., posts 310, 312, and 314) can be aligned to simplify bussing. Various wires can be run between the controllers 304-308 within the motor controller module 100 and/or outside the motor controller module 100 (e.g., via the I/O plate 202). In FIG. 3, only three motor controllers are shown to be mounted on the middle top and the sloped sides of the roof of the motor controller module 100. However, any number of motor controllers can be mounted within the motor controller module 100.

The motor controllers 304-308 of the motor controller module 100 can be applied to various machines, e.g., lawn mowers, snow throwers, aerator, spreaders, etc. The number of motor controllers and/or the number of motor controller modules may be dependent on the machine. For example, for a ZTR, there may be three lawn mower blades and two drive wheels. A total of five motor controllers may be necessary for controlling the ZTR lawnmower. In this regard, a first module may include at least two motor controllers for operating the two drive motors and a second motor controller module can include three motor controllers in communication with the two drive motor controllers for operating the lawn mower blades. Furthermore, the multiple modules may include controllers for specific tasks. For example, there may be a "drive module" that includes controllers for operating drive motors and a "chore module" a controller for operating chore motors (e.g., for lawn mower blades, spreaders, augers, blowers, debris collectors, etc.). In some embodiments, there may be one or multiple chore modules and/or drive modules.

In some embodiments, a module may include both chore controllers and drive controllers. For example, a drive module may have space for three controllers but only require two controllers for driving the wheels. In this regard, the remaining space may be populated with a chore controller for controlling a chore motor.

Figure 4:
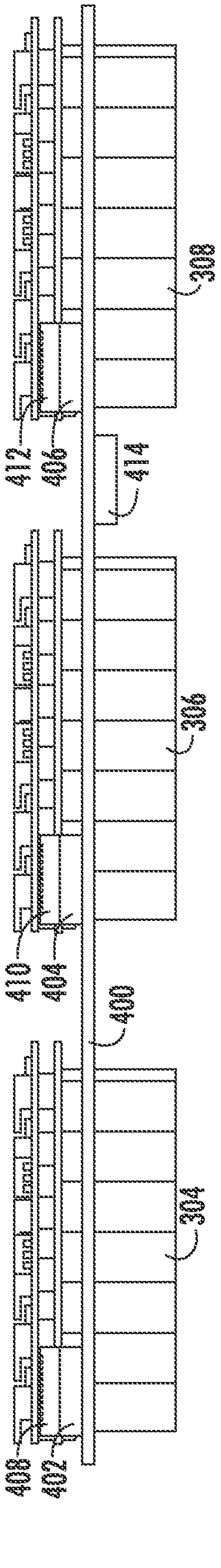
FIG. 4 is a diagram of the motor controller module of FIG. 1 shown to include a mezzanine board connecting the motor controllers of FIG. 3, according to an exemplary embodiment.

Referring now to FIG. 4, a main PCB connecting the motor controllers 304-308 is shown, according to an exemplary embodiment. The main PCB, mezzanine PCB 400, is shown to connect the three motor controllers 304-308 via connectors 402, 404, and 406 which are components of the mezzanine PCB 400. The mezzanine PCB 400 can provide all communication traces and/or connector pass-through for connecting external power and/or any other communication connection to the controllers 304-308. This can greatly reduce and/or eliminate wiring within the motor controller module 100.

Each of the controllers 304-308 are shown to include a connector. The controller 304 includes the communications port 408, the controller 306 includes the communications port 410, and the controller 306 includes the communications port 412. In some embodiments, the connectors 402-406 are male connectors that connect directly with the communications ports 408-412 where the connector for the communications ports 408-412 are female connectors (or vice versa). The mezzanine PCB 400 is shown to include an external connector 414. The external connector 414 can connect the controllers 304-308 to other controllers (via a bus), to a power source (e.g., a battery or a charging source), and/or to various external devices (e.g., via I/O or a bus).

In some embodiments, a ribbon cable or other connector is used between the communications ports 408-412 and 402-406, this can be implemented where the controllers 304-308 are positioned at different angles (e.g., as shown in FIG. 3). In some embodiments, the mezzanine PCB 400 is a flexible PCB. When the controllers 304-308 are positioned at different angles (e.g., as shown in FIG. 3), a flexible PCB can be implemented to account for the angles of the controllers 304-308. In some embodiments, the mezzanine PCB 400 is shaped such that it includes one flat side and two diagonal sides to account for the slopped installation of motor controllers 304-308 e.g., as shown in FIG. 3 (e.g., the slopped sides of the mezzanine PCB 400 could be parallel with the sloped sides of the roof of the motor controller module 100 and the flat side parallel with the top of the motor controller module 100.

Figure 5:
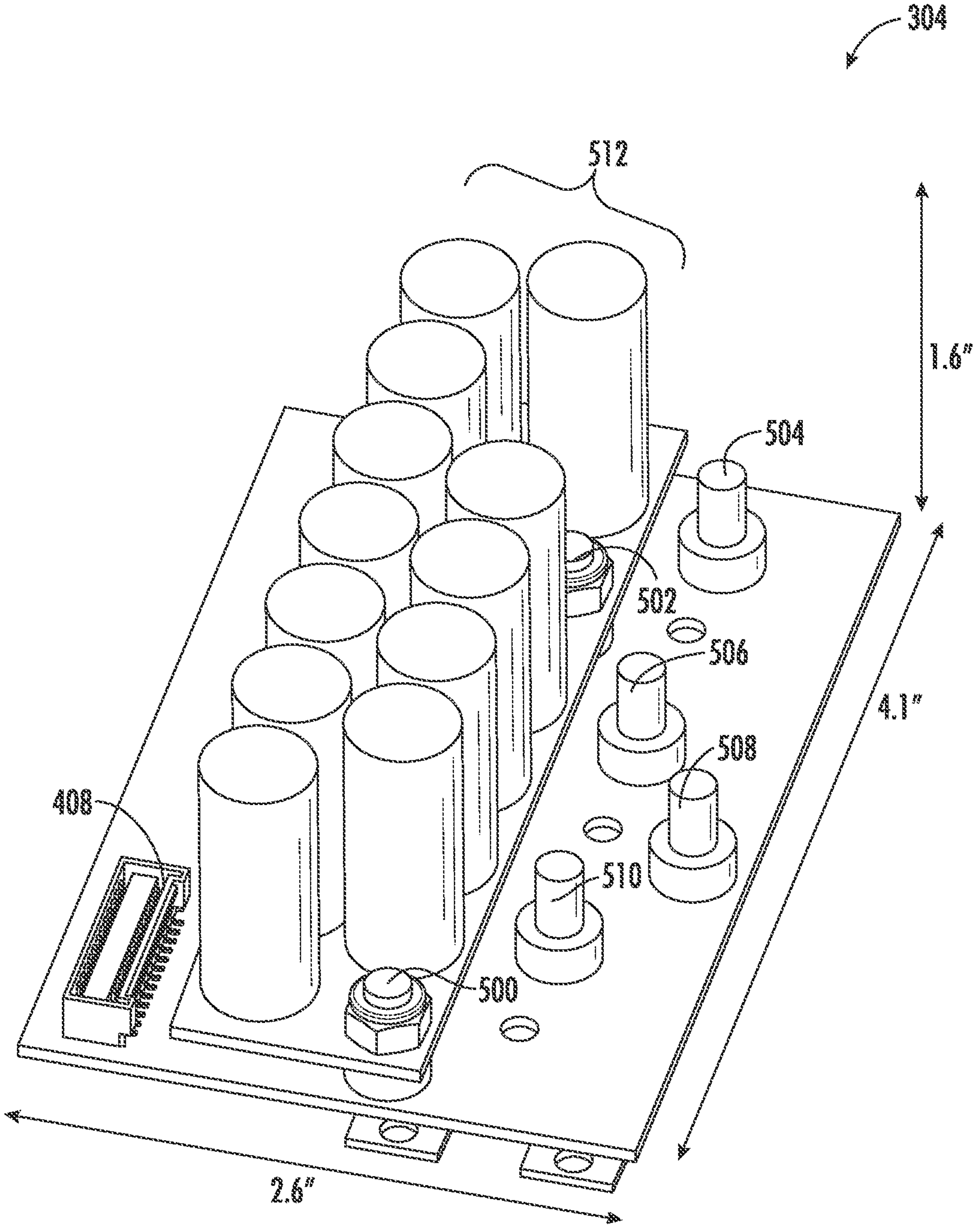
FIG. 5 is a diagram of one of the motor controllers of FIG. 3, according to an exemplary embodiment.

Referring now to FIG. 5, a diagram of the motor controller 304 is shown, according to an exemplary embodiment. The motor controller 304 is shown to have a length of 2.6 inches, a width of 4.1 inches, and a height of 1.6 inches. However, the motor controller 304 is not limited to the dimensions shown in FIG. 5 and may be any appropriate dimensions. The motor controller 304 is shown to include a communications port 408. The communications port can be configured to communicate with other motor controllers (e.g., the motor controller 306 and the motor controller 308 via bus connections (e.g., a controller area network (CAN) bus)), can include analog inputs, analog outputs, digital inputs, digital outputs, a motor position connection, and/or motor sensor inputs. Using a communications bus can reduce and/or minimize cabling. In some embodiments, the communications port 408 includes two analog inputs, one analog output, seven digital input/output connections, CAN 2.0b connections, a motor position input, and five motor sensor inputs.

Connectors 500 and 502 can be power connectors for connecting to a power source (e.g., a battery). The power connectors 500 and 502 can provide power to a power circuit of the motor controller 304 for powering the motor controller 304. Furthermore, the motor controller 304 is shown to include motor control outputs 504-510. The motor controller 304 can be configured to generate and/or switch one or more control signals for a motor and operate the motor based on voltages and/or signals (e.g., static voltage signal, a pulse wave modulated (PWM) signal, etc.) via the motor control outputs 504-510. The motor controller 304 is shown to include various capacitors 512. The capacitors 512 can be ceramic capacitors, electrolytic capacitors, and/or any other suitable type of capacitor. The capacitors 512 can facilitate signal filtering and/or regulation for the motor controller 304.

The controller 304 can include enough I/O to run both user interface and safety interfaces of a ZTR or other outdoor power equipment. If the controller 304 is not being used to manage user and/or safety interfaces (or even if the controller 304 is managing user and/or safety interfaces), the computing power and/or I/O of the controller 304 can be utilized to perform high level operations e.g., straight line assistance, collision avoidance, advanced user interface features, which are described in greater detail elsewhere herein, specifically with reference to FIG. 11.

Referring now to FIGS. 6-9, the motor controller 304 is shown from multiple perspectives, according to an exemplary embodiment. The motor controller 304 is shown from a left side perspective (FIG. 6), a top perspective and a front perspective (FIG. 7), a right side perspective (FIG. 8), and a bottom perspective (FIG. 9). The bottom perspective illustrates the various transistors 900 of the motor controller 304 (e.g., a metal-oxide-semiconductor field-effect transistor (MOSFET transistor), bipolar junction transistor (BJT transistor), etc.). The transistors may generate a large amount of heat and thus may be kept on the bottom side of a PCB of the motor controller 304. The bottom side of the motor controller 304 may be mounted flush or directed towards the enclosure of the motor controller module 100 (e.g., as shown in FIG. 3) to dissipate heat generated by the motor controller 304 via the heatsink 104 of the motor controller module 100. For example, the transistors (or other heat generating elements) can be on one side of the PCB and in contact with, or close contact with, an aluminum housing of the controller module 100 which in turn is in contact with the heatsink 104. This can cause the motor controller module 100 to be kept at a low temperatures for the operation of the controllers 304-308. Keeping the controllers 304-308 cool may be important in some cases since the controllers 304-308 may switch high current, for example, to drive a motor, which the cool temperature within the motor controller 304 may aid and/or enable for long periods of time.

Figure 10:
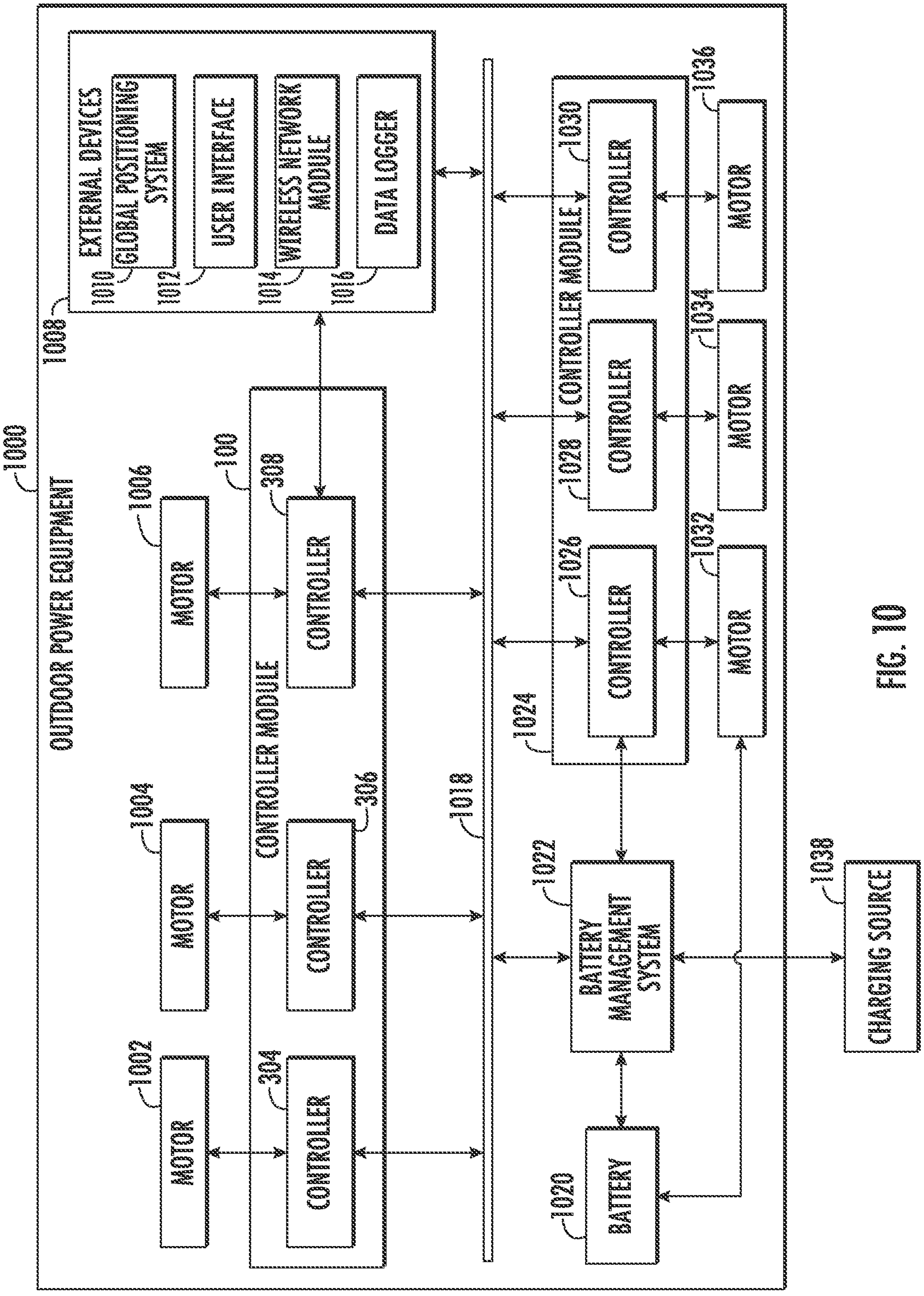
FIG. 10 is a diagram of a distributed motor controller system for outdoor power equipment shown to include the motor controller module of FIG. 1 and the motor controllers of FIG. 3, according to an exemplary embodiment.

Referring now to FIG. 10, outdoor power equipment 1000 including a distributed motor controller system is shown, according to an exemplary embodiment. The outdoor power equipment 1000 is shown to include a bus 1018, the controller module 100 and another controller module 1024. Furthermore, the outdoor power equipment 1000 is shown to include a battery pack (e.g., the battery 1020) a battery management system 1022 and external devices 1008. In some embodiments, the battery management system 1022 is incorporated into the battery 1020. The battery 1020 can include one or more distinct batteries including one or more battery cells (e.g., lithium ion battery cells and/or any other type of battery cell as described herein or that is suitable). The external devices 1008 and the battery management system 1022 can be configured to communicate directly to the controllers of the controller modules 100 and 1024 and/or via the bus 1018. The controllers 304-308 and/or 1032-1036 can dynamically interface with the battery management system 1022 to ensure optimal operation of the outdoor power equipment 1000 while protecting the battery 1020.

The bus 1018 may be one or more wires, traces, and/or electronic connections for facilitating a bus communications protocol for communication between the components of the outdoor power equipment 1000. For example, the protocol for the bus 1018 may be CAN bus (e.g., CAN 2.0, CAN 2.0A, CAN 2.0B, etc.). The components of the outdoor power equipment 1000 connected to the bus 1018 can each send and/or receive information via the bus 1018 and/or can send various commands to each other via the bus 1018. For example, the controllers 304-308 can send various operational commands to each other and/or to the external devices 1008 via the bus 1018.

The controller module 100 is shown to include the controllers 304-308. The controller 304 can be configured to operate a motor 1002, the controller 306 can be configured to operate a motor 1004, while the controller 308 can be configured to operate a motor 1006. The controllers 304-308 can be configured to provide a continuous current of up to 120 amperes to the various motors that they control, according to some embodiments. Furthermore, the controller module 1024 is shown to include a controller 1026, a controller 1028, and a controller 1030. The controller 1026 can be configured to operate the motor 1032. The controller 1028 can be configured to operate the motor 1034, while the controller 1030 can be configured to operate the motor 1036. The controllers 1032-1036 can be the same as and/or similar to the controllers 304-308 The motors 1002-1006 and 1032-1036 can be battery powered motors that drive wheels and/or external devices (e.g., a lawn mower blade, a compressor, a spreader, etc.). In some embodiments, the motors 1002-1006 and 1032-1036 can be pre-synched. The motors 1002-1006 and 1032-1036 can be DC motors (e.g., a brushless DC motor controlled with a fast switching algorithm) and/or AC motors. The motors 1002-1006 and/or 1032-1036 can be self-commutated motors and/or externally commutated motors.

As an example, the motor 1032 is shown to be powered via a battery 1020. Although not shown, each of the motors 1002-1006 and/or 1032-1036 can be powered by their own battery and/or by a shared battery that is similar to and/or the same as the battery 1020. The battery 1020 can be a lithium-ion (Li-ion) battery, a lithium-ion Polymer (Li-pol) battery, a lead-acid battery, a nickel-cadmium (NiCd) battery, a nickel-metal hydride (NiMh) and/or any other type of battery configured to store and/or discharge energy. The battery 1020 may have various capacities, e.g., 0.1 kWh, 0.5 kWh, 1 kWh, 3 kWh, 10 kWh, 50 kWh, etc.

The outdoor power equipment 1000 is shown to include a battery management system 1022. The battery management system 1022 can be configured to operate the battery 1020 to charge and/or discharge. For example, the battery management system 1022 can be configured to cause the battery 1020 to be charged based on energy of a charging source 1038. For example, the charging source 1038 (e.g., a wall outlet of a home, an outlet of a generator, another battery, etc.) can provide power to the battery management system 1022 which can be configured to cause the battery 1020 to be charged based on the power sourced from the charging source 1038.

Furthermore, the battery management system 1022 can be configured to cause the battery 1020 to discharge energy to power and/or operate the motor 1032. In some embodiments, the battery management system 1022 can be configured to monitor various parameters of the battery 1020. For example, the battery management system 1022 can be configured to measure, via various sensors (e.g., shunt resistors, voltage sensors, hall effect sensors, thermocouples, thermistors, etc.), a battery temperature, a battery voltage, a battery current, and/or any other battery parameter.

The outdoor power equipment 1000 is shown to include the external devices 1008. The external devices 1008 can be located within either the controller module 100 and/or the controller module 1024. However, in some embodiments, the external devices 1008 are located outside the controller module 100 an/or the controller module 1024. Each of the external devices 1008 can communicate with the controllers of the controller module 100 and the controller module 1024 via analog input, analog output, digital input, and/or digital output of the controllers. Furthermore, in some embodiments, the external devices 1008 can be configured to communicate with the controllers 304-308 and/or 1032-1036 via the bus 1018.

The external devices 1008 can include a global positioning system 1010. The global positioning system 1010 can be a satellite based radio navigation system configured to generate one or more coordinates (e.g., a latitude value, a longitude value, an altitude value) identifying a location of the outdoor power equipment 1000. In some embodiments, the global positioning system 1010 provides an indication of the coordinates to any of the controllers of the controller module 100 and/or the controller module 1024.

The external devices 1008 are further shown to include a user interface 1012. The user interface 1012 can be one or more light emitting diodes (LEDs), a display screen (e.g., a LED screen, a touch screen (e.g., a resistive touch screen, a capacitive touch screen, etc.), etc.), a steering wheel, a throttle control, one or more ZTR drive sticks, buttons (e.g., one or more buttons to enable a chore function (e.g., turn on lawn mower blades, turn off lawn mower blades, select blade speed, start spreader, stop spreader, select spreader speed, turn on compressor, etc.)), and/or any other input and/or output device.

In some embodiments, the user interface 1012 can include LEDs placed on the floor of the outdoor power equipment 1000 (e.g., near a footplate of a ZTR) and/or on the deck of the outdoor power equipment 1000 which indicate, via color (e.g., red, yellow, green) a power draw for each of the batteries of the outdoor power equipment 1000. In some embodiments, the user interface 1012 can be attached to the outside of the motor controller module 100. If the outdoor power equipment 1000 is a hybrid device, the user interface 1012 can indicate an amount of motor usage of the motors of the outdoor power equipment 1000 to the user. Providing these power draw indications can indicate to a user which parts of a vehicle are using the power and in what amount.

The external devices 1008 are shown to include a wireless network module 1014. The wireless network module 1014 can be configured to communicate and/or manage a wireless network (e.g., a Bluetooth network, a Zigbee network, a Wi-Fi network, a cellular network (e.g., 3G, LTE, etc.). In this regard, the controllers 304-308 and/or 1032-1036 can be enabled to communicate with various Internet servers, a smartphone, tablet, laptop computer, other outdoor power equipment 1000, etc.

The external devices 1008 are shown to include a data logger 1016. The data logger 1016 can be a storage device configured to record and store a log of data for the outdoor power equipment 1000. In some embodiments, the data logger 1016 receives data from the controllers 304-308 and/or 1032-1036 and/or the battery management system 1022 via the bus 1018. The data logger 1016 can be configured to store, in a hard drive, database, etc. the logged data. The data may be operational data for the outdoor power equipment 1000. Operational data can include: battery charge amounts, motor speeds, average motor speeds, runtime, faults, etc.

In some embodiments, the external devices 1008 include vehicle lighting systems. For example, the external devices 1008 can include headlights (e.g., brights, day lights, etc.), brake lights, and/or any other lighting system. In this regard, the controllers 304-308 and/or the controllers 1032-1036 can operate the lighting systems of the outdoor power equipment 1000.

Still referring to FIG. 10, the controller module 100 and the controller module 1024 can both be configured to perform separate jobs. For example, in some embodiments, the controller module 100 can be configured to drive the outdoor power equipment 1000 (e.g., the motors 1002-1006 can be drive motors) while the controller module 1024 can be configured to perform chore functions for the outdoor power equipment 1000. For example, the controller 308 can receive user input indicating that the outdoor power equipment 1000 should drive forward and that three lawn mower blades of the outdoor power equipment 1000 should be operated. The controller 308 may operate a left motor 1006 of the outdoor power equipment 1000 while the controller 306 can be configured to operate a right motor 1004. The controller 1026, the controller 1028 and the controller 1030 can each be configured to operate a lawn mower blade via the motors 1032-1036. In this regard, the controller 308 can operate the motor 1006 to drive the outdoor power equipment 1000, communicate a command via the bus 1018 to the controller 306 to operate the motor 1004 to drive the outdoor power equipment 1000, and can communicate a command to operate the motors 1032-1036 to the controllers 1032-1036 via the bus 1018.

In some embodiments, rather than including two controller modules (the controller module 100 and the controller module 1024), the outdoor power equipment 1000 can include a single controller module, the controller module 100. For example, if the outdoor power equipment 1000 is a spreader or a snow thrower, the outdoor power equipment 1000 may only include three motors. For example, for a snow thrower, the outdoor power equipment 1000 may include a motor for a right wheel of the snow thrower, a motor for a left wheel of the snow thrower, and a motor to operate the snow thrower auger. For the example of a snow thrower, the controller 308 may operate a right wheel of the snow thrower via the motor 1006, the controller 306 can operate a left wheel of the snow thrower via the motor 1004, and the controller 304 can operate the auger of the snow thrower. If the controller 308 receives user input via the user interface 1012 to drive the snow thrower forward and/or operate the auger, the controller 308 can operate the motor 1006 to operate to drive the snow thrower forward, communicate a command to the controller 306 via the bus 1018 to drive the snow thrower forward via the motor 1004, and/or communicate a command to the controller 304 to operate the auger of the snow thrower via the motor 1002.

It should be understood that the operations of each of the controllers can be interchangeable. For example, any one of the controllers 304-308 and/or 1032-1036 can be configured to receive user input and/or operate a drive motor and/or a chore motor. Furthermore, in some embodiments, each of the controllers 304-308 and 1032-1036 can be configured to receive user input directly from the user interface 1012 (e.g., via the bus 1018) and therefore, one controller may not be required to communicate a command and/or an indication of user input to the other controllers.

In some embodiments, the external devices 1008 include a power take off (PTO) and/or a PTO clutch. Any of the controllers 304-308 and/or 1032-1036 can operate the PTO clutch via the bus 1018 and/or via direct wiring connections to the PTO clutch. In some embodiments, the outdoor power equipment 1000 may have a rear PTO for connecting an external device (e.g., a rear lawn mower deck, a post hole digger, etc.) In some embodiments, if a user connects to a rear PTO and provides input to operate lawn mower blades of the outdoor power equipment 1000, one of the controllers 304-308 and/or 1032-1036 can determine, via the rear PTO, that a connection has been made to the rear PTO and can automatically determine to not operate lawn mower blades of the outdoor power equipment 1000 even though a user may have indicated to operate the lawn mower blades and instead operate the rear PTO.

In some embodiments, one or more of the controllers 304-308 and/or 1032-1036 can be configured to operate brakes for the motors 1002-1006 and/or 1032-1036 (for example mechanical brakes for the drive motors and/or the chore motors). In some embodiments, the brake is a resistive load on the motor that dissipates current to stop the motor in case there is a malfunction (e.g., a battery malfunction). In some embodiments, where the motor is a stepper motor, the controllers 304-308 and/or 1032-1036 can magnetically latch the motor (short the motor) to stop it.

In some embodiments, one or multiple controllers of the controllers 304-308 and/or the controllers 1032-1036 can store a database of operational parameters and/or control algorithms for operating the outdoor power equipment 1000 which are dependent on the type of the outdoor power equipment 1000. Furthermore, the control algorithms may be specific to different types of external devices 1008. Via the bus 1018, a controllers of the controllers 304-308 and/or 1032-1036 can receive an indication of the type of the outdoor power equipment 1000 and/or the type of a particular external device of the external devices 1008 from the external devices 1008 can identify the type of the outdoor power equipment 1000 and/or the type of the external devices 1008 and retrieve the various control algorithms and/or parameters to operate the outdoor power equipment 1000.

In some embodiments, controller 308 can communicate an operational state of motor 1006 (e.g., motor speed, motor direction, etc.) to controller 306. In this regard, based on the operational state of motor 1006, controller 306 can operate motor 1004. Similarly, controller 306 can communicate an operational state of motor 1004 to controller 308 which can be configured to operate motor 1006 based on the operational state received from controller 306.

In some embodiments, rather than, or in addition to, communicating operational states between controllers via bus 1018, controller 308 and/or 306 can infer, or operate on data indicative of, an operational state of another motor. For example, controllers 306 and/or 308 could receive all (or some) user input for outdoor power equipment 1000 (e.g., all drive information for two ZTR drive sticks, chore motor operation input, analog inputs, digital inputs, etc.). In this regard, input directly relevant for controller 306 to operate motor 1004 can be used by controller 308 to operate motor 1006 while input for controller 308 can be used by controller 306 to operate motor 1004. In this regard, the state of one motor can bias the state of another motor with or without communication via bus 1018.

Figure 11:
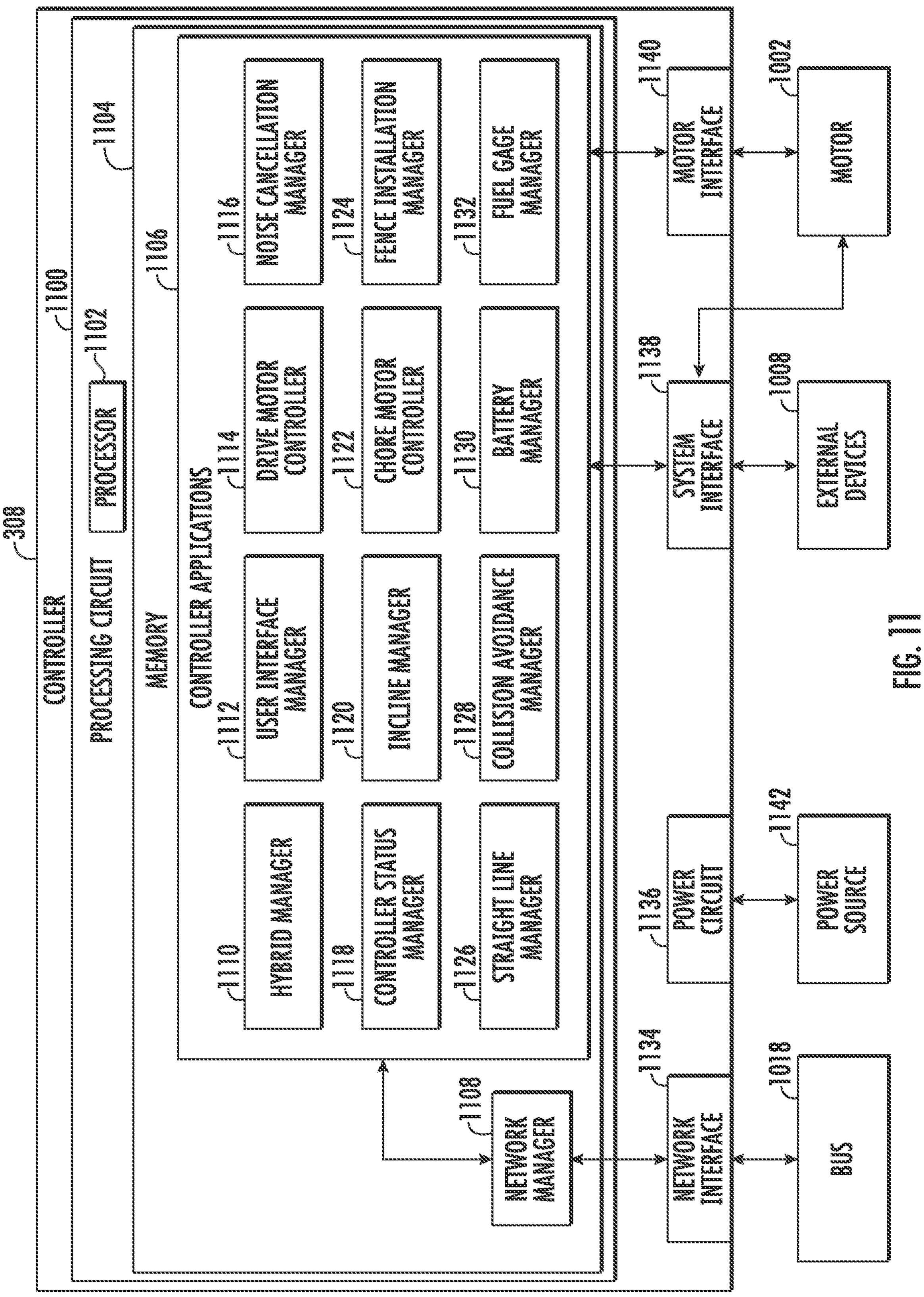
FIG. 11 is a block diagram illustrating the motor controller of FIG. 5 in greater detail, according to an exemplary embodiment.

Referring now to FIG. 11, the controller 308 is shown in greater detail, according to an exemplary embodiment. While FIG. 11 provides a detailed description of the controller 308, the functionality described with reference to FIG. 11 can be applied to any of the controllers described herein (for example, the controllers described with reference to FIG. 10).

The controller 308 is shown to include a processing circuit 1100. The processing circuit 1100 is shown to include a processor 1102 and a memory 1104. While the controller 308 is shown to include one processing circuit 1100, it should be understood that the controller 308 can include any number of processing circuits 1100 and/or the functionality of the processing circuit 1100 can be distributed across multiple processing circuits (e.g., across multiple integrated circuits).

The processor 1102 can be implemented as a general purpose processor, an application specific integrated circuit (ASIC), one or more field programmable gate arrays (FPGAs), a group of processing components, or other suitable electronic processing components. The memory device 1104 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 1104 may be or include volatile memory or non-volatile memory. The memory device 1104 may include database components, object code components, script components, or any other type of information structure for supporting the various activities and information structures described in the present application. According to an exemplary embodiment, the memory device 1104 is communicably connected to the processor 1102 via the processing circuit 1100 and includes computer code for executing (e.g., by processing circuit and/or processor) one or more processes described herein.

The controller 308 is shown to include a network interface 1134, a power circuit 1136, a system interface 1138, and a motor interface 1140. The network interface 1134 can be, can include, and/or can be a part of the communications port 408 as described with reference to FIG. 4. The network interface 1134 can include one or more circuits configured to allow the processing circuit 1100 to communicate data (e.g., send and/or receive) data via the bus 1018. The power circuit 1136 can include one or more circuits configured to power the controller 308. For example, the power circuit 1136 can include one or more transformers, rectifiers, filters, voltage regulators, etc. configured to power the controller 308 via a power source 1142. The power source 1142 may be a battery, for example, a battery that is the same as and/or separate from (but can be similar to) the battery 1020 (e.g., a battery for powering the motor that the controller 308 can operate). The power circuit 1136 can include one or more connectors for connecting to the power source 1142. The connectors may be the power connectors 500 and/or 502 as described with reference to FIG. 5.

The system interface 1138 can be an interface circuit configured to communicate with the external devices 1008. In some embodiments, the system interface 1138 is similar to, the same as, and/or part of the communications port 408 as described with reference to FIG. 5. In this regard, the system interface 1138 can include one or more analog input circuits, analog output circuits, digital input circuits, digital output circuits, etc. The system interface 1138 can further be connector to the motor 1006 and can be configured to receive motor measurements (or can make motor measurements) via the connections to the motor 1006. For example, various motor sensors of the motor 1006 can interface with the controller 308 via the system interface 1138. The motor interface 1140 can be one or more circuits configured to operate the motor 1006. For example, the motor interface 1140 can include one or more switches, amplifiers, signal generators, etc. The motor interface 1140 can include the motor control outputs 504-510 as described with reference to FIG. 5.

The memory 1104 is shown to include a network manager 1108 and controller applications 1106. The network manager 1108 can be configured to perform one or more network protocols (e.g., CAN protocols) to enable the controller applications 1106 to communicate via the bus 1018. The controller applications 1106 can include one or more modules configured to perform operations for the controller 308. Each of the modules can communicate data to other controllers and/or to a battery management system via the network manager 1108, the network interface 1134, and/or the bus 1018. Furthermore, the controller applications 1106 can communicate with the external devices 1008, receive data from the motor 1006, and/or operate the motor 1006 via the system interface 1138 and/or the motor interface 1140.

The controller applications 1106 include a hybrid manager 1110. The hybrid manager 1110 can be configured to operate a hybrid device (where the outdoor power equipment 1000 is a hybrid device that runs on both a gas engine and a motor with one or more batteries). The hybrid manager 1110 can receive an indication of the voltage or state of charge (SoC) of the one or more batteries (e.g., from the battery management system 1022) and can be configured to operate a throttle of the gas engine based on the measurement. The hybrid manager 1110 can be configured to distribute power in a power train of the hybrid system and/or can be configured to operate switching mechanisms causing the one or more batteries to charge and/or discharge in order to use a low (or minimal) amount of gas power.

The controller applications 1106 include a user interface manager 1112. The user interface manager 1112 can be configured to operate a user interface of the external devices 1008. For example, the user interface manager 1112 can be configured to cause a user interface to display sensed and/or received information, e.g., engine speeds, battery SoC, etc. In some embodiments, the user interface manager 1112 receives user control inputs, e.g., sticks forward or backward by particular amounts, turn of a steering wheel, etc.

The user interface manager 1112 can operate in a high accuracy mode or a high speed mode. The high accuracy mode may analyze control inputs from the user for driving the outdoor power equipment 1000 with high accuracy such that small changes to inputs (e.g., input drive sticks of a ZTR) causes a high resolution response to the small changes of the inputs. The user interface manager 1112 can operate in the high accuracy mode when the user input received via the user interface manager 1112 indicates to drive the outdoor power equipment 1000 slowly (e.g., a drive speed indication of the user input is less than a predefined amount). For a lawn mower, if the user is attempting to drive slowly, this may indicate that they are attempting to carefully mow grass around an object. In this regard, the user may desire responsiveness and thus the user interface manager 1112 can operate in the high accuracy mode. Operating in the high accuracy mode may cause the user input to be a first resolution, or down sampled to a first resolution.

When the user input speed is greater than a predefined amount, the user interface manager 1112 can operate in the high speed mode. In this regard, the user interface manager 1112 can down sample the user input to a second resolution, less than the first resolution. This can cause the outdoor power equipment 1000 to be less responsive to changes in user input when a user is attempting to drive the outdoor power equipment 1000 fast.

The controller applications 1106 include a drive motor controller 1114. The drive motor controller 1114 can cause the motor 1006 to be operated to drive the outdoor power equipment 1000. For example, if the controller 308 is configured to operate a drive motor, the drive motor controller 1114 may be enabled and operate to control the motor

1006 based on user input. For example, based on a throttle position, an input stick position, etc. the drive motor controller 1114 can be configured to operate the motor 1006 to drive the outdoor power equipment 1000.

The controller applications 1106 include a noise cancellation manager 1116. The noise cancellation manager 1116 can be configured to operate a motor (or generate control commands for multiple motors) such that one or multiple motors can operate at a reduced sound level. Noise controller commands can be communicated among controllers of a single motor controller module or multiple motor controller modules (e.g., between a chore motor controller module of a lawn mower deck and a drive motor controller for driving a lawn mower). For example, when two sound waves are identical but have inverted phase, the waves cancel each other out (destructive waves or destructive harmonics). In this regard, the noise cancellation manager 1116 can set one motor to run at a first speed and a second motor to run at a second speed such that the first speed and the second speed result in a reduced (or minimal) amount of sound. For example, the noise cancellation manager 1116 can receive a command to operate a first lawn mower blade (or a set of lawn mower blades) at a predefined speed.

The noise cancellation manager 1116 can operate the motor 1006 at the first speed and communicate a command to a second controller to operate a second motor at a second speed such that the second speed and the first speed together reduce noise.

Furthermore, the noise cancellation manager 1116 can be configured to time a first motor and a second motor such that the sound of the motors is reduced. For example, the noise cancellation manager 1116 can receive an input to operate two lawn mower blades time the two lawn mower blades (one controlled by the controller 308 via motor 1006 and the second controlled by another controller that receives a lawn mower control command from the controller 308) such that the timing of the two lawn mower blades reduces noise.

The controller applications 1106 include a controller status manager 1118. The controller status manager 1118 can be configured to monitor the status of the controller 308. For example, the controller status manager 1118 can identify whether the controller 308 is properly powered via the power circuit 1136, determine whether a motor control command of the motor 1006 is operating properly based on feedback received from the motor 1006, determine whether any software faults have occurred for the controller 308, etc. The controller status manager 1118 can cause an indicator (e.g., a display screen icon, a LED, etc.) to indicate that the controller 308 is operating. This can allow a technician to determine whether the controller 308 is functional before attempting to replace the controller 308. In some embodiments, the indicator is located on the controller module 100 or on a harness of the outdoor power equipment 1000.

The controller applications 1106 include an incline manager 1120. The incline manager 1120 can be configured to control the outdoor power equipment 1000 to drive in a straight line even when the outdoor power equipment 1000 is operating on sloped ground. For example, if the outdoor power equipment 1000 is driving along the side of a hill (for example, if the lawn of an operator is sloped and an operator is attempting to cut the grass of the lawn in a straight line), correction may be required to cause the outdoor power equipment 1000 to drive in a straight line. The incline manager 1120 can be configured to receive accelerometer data and/or gyroscope data from an accelerometer and/or gyroscope. In some embodiments, the controller 308 includes an accelerometer and/or gyroscope on the PCB of the controller 308. In some embodiments, the controller 308 is connected and/or communicates with an accelerometer and/or gyroscope (e.g., the external devices 1008).

The data received from an angle sensing device (e.g., the accelerometer and/or gyroscope) may by the incline manager 1120 be indicative of a roll of the outdoor power equipment 1000. In this regard, the incline manager 1120 can determine whether the roll is greater than a predefined amount and whether line correction is necessary. In response to determining that the roll is greater than a predefined amount and/or based on the polarity of the roll (whether the outdoor power equipment 1000 is rolling clockwise or counterclockwise) the incline manager 1120 can be configured to operate one or more drive wheels to keep the outdoor power equipment 1000 driving in a straight line.

In some embodiments, the controller 308 operates a right drive wheel via the motor 1006. In this regard, based on a user preferred speed, an amount of roll, and a polarity of the roll, the incline manager 1120 can operate the right wheel at a right wheel speed. Furthermore, the incline manager 1120 can determine a left roll speed and communicate via the bus 1018, the left wheel speed to another controller configured to operate the left wheel. The left wheel speed may be offset from the right wheel speed based on an amount of the roll and a polarity of the roll. For example, if the outdoor power equipment 1000 is in a roll to the right, the right wheel speed may be a particular amount greater than the left wheel speed. The right wheel speed and/or the left wheel speed may be based on a user directed drive speed and a magnitude of the roll. Similarly, if the outdoor power equipment 1000 is in a roll to the left, the left wheel may be driven at a higher speed than the right wheel to keep the outdoor power equipment 1000 driving in a straight line.

The controller applications 1106 include a chore motor controller 1122. If the motor 1006 is a chore motor, a motor for driving a blower, an auger, a spreader, a lawn mower blade, etc., the chore motor controller 1122 can be configured to operate the motor 1006. In some embodiments, the motor interface 1140 that includes one or multiple switches (e.g., transistor switches, relay switches, etc.). The chore motor controller 1122 can be configured to operate the motor interface 1140 to run the motor 1006 at varying speeds to perform the functionality of a chore motor.

The controller applications 1106 include a fence installation manager 1124. The fence installation manager 1124 can be configured to cause the outdoor power equipment 1000 to install a fence with multiple fence posts. In some cases, an operator of the outdoor power equipment 1000 may wish to use the outdoor power equipment 1000 to space fence posts at predefined amounts. In some embodiments, the fence installation manager 1124 can be configured to receive a fence post spacing from the user interface 1012, from a smartphone via the wireless network module 1014, etc. For example, the fence post spacing may be 7 feet, 8 feet, 9 feet, etc. The fence installation manager 1124 can be configured to operate one or more driver motors to drive the outdoor power equipment 1000 (either based on user command or autonomously) and stop once the fence post spacing is reached. In some embodiments, the fence installation manager 1124 communicates drive and stop commands to other controllers via the bus 1018 that are responsible for operating drive motors. In some embodiments, the fence installation manager 1124 itself operates a drive motor (e.g., the motor 1006).

Based on coordinates of the outdoor power equipment 1000 and/or based on a stored size of the drive wheels and a speed of the drive wheels, the fence installation manager 1124 can determine when to stop the outdoor power equipment 1000. For example, the outdoor power equipment 1000 can determine, based on the speed of the wheel and the size of the wheel (e.g., the diameter, circumference, and/or radius) when the fence post spacing has been reached. In response to reaching the fence post spacing, the fence installation manager 1124 can cause the outdoor power equipment 1000 to stop. Furthermore, the fence installation manager 1124 can receive a coordinate from the global positioning system 1010 and drive the outdoor power equipment 1000 until a second coordinate is reached where the distance between the first coordinate and the second coordinate is (or is greater than or at least a predefined amount less than, and/or within a range of) the fence post spacing. In some embodiments, the fence installation manager 1124 uses both the speed of the drive wheels and the coordinate to perform the fence post spacing. For example, the fence installation manager 1124 can use the global positioning system coordinates to identify a rough estimate of the spacing and use the speed of the wheel and the size of the wheel to fine tune the spacing.

The controller applications 1106 include a straight line manager 1126. The straight line manager 1126 can be configured to be activated when the outdoor power equipment is a ZTR. The straight line manager 1126 can receive user input from the user interface 1012 and identify whether the user is attempting to drive in a straight line. In some embodiments, the user interface 1012 includes a button causing the straight line manager 1126 to be activated or deactivated. The straight line manager 1126 can receive input from two different drive wheel controls (for example, ZTR drive sticks).

The straight line manager 1126 can be configured to determine whether the input from the drive sticks are within a predefined amount from each other. If the input from the two drive sticks are within the predefined amount, the straight line manager 1126 can cause two drive motors of two drive wheels to operate at the same speed (e.g., based on an average input of the drive sticks). In some embodiments, the straight line manager 1126 sends a command to other controllers responsible for controlling the drive motors. In some embodiments, the straight line manager 1126 controls one or both of the drive motors directly, e.g., controls the motor 1006.

The controller applications 1106 include a collision avoidance manager 1128. The collision avoidance manager 1128 can communicate with one or more collision sensors (e.g., the external devices 1008). For example, collision avoidance sensors can include proximity sensors, backup cameras, camera vision systems, light detection and ranging (Lidar) systems, a radio detection and ranging (RADAR) system, etc. Based on the input from systems (e.g., either or both of raw data input that can be processed by the collision avoidance manager 1128 or processed data by the system) the collision avoidance manager 1128 can determine whether a collision is imminent (will occur), has occurred, or may occur unless response actions are taken. In some embodiments, the collision avoidance manager 1128 can communicate a visual and/or audio indication of an impending collision determined by the collision avoidance manager 1128 based on the collision sensors (e.g., operate a display, indicator, and/or speaker of the user interface 1012). In some embodiments, the controller applications 1106 include an autonomous vehicle control application configured to implement the collision avoidance manager 1128 to autonomously control the outdoor power equipment 1000.

The controller applications 1106 include a battery manager 1130. The battery manager 1130 can communicate with the battery management system 1022. Based on various battery metrics received from the battery management system 1022, the battery manager 1130 can determine whether there is a battery fault and/or whether the battery 1020 needs to be charged. For example, if a battery current is greater than a predefined amount, the battery manager 1130 can generate an alarm and present the alarm to a user via the user interface 1012.

The controller applications 1106 include a fuel gage manager 1132. The fuel gage manager 1132 can be configured to generate an indication of the charge of the battery 1020 based on battery metrics and/or based on a battery charge received from the battery management system 1022. In some embodiments, the indication is an hours to empty, miles to empty, and/or any other indicator that the fuel gage manager 1132 can be configured to determine based on the battery metrics and/or battery charge received from the battery management system 1022. In some embodiments, the fuel gage manager 1132 can detect what attachments are connected to the outdoor power equipment 1000 (e.g., rear PTO, wireless radio, etc.), e.g., what components are communicating via the bus 1018. Based on the components communicating via the bus 1018 and how much power those components consume, this may be indicative of the drawing on the battery 1020 and thus the indication of battery charge can be based on the identified attachments.

Figure 12:
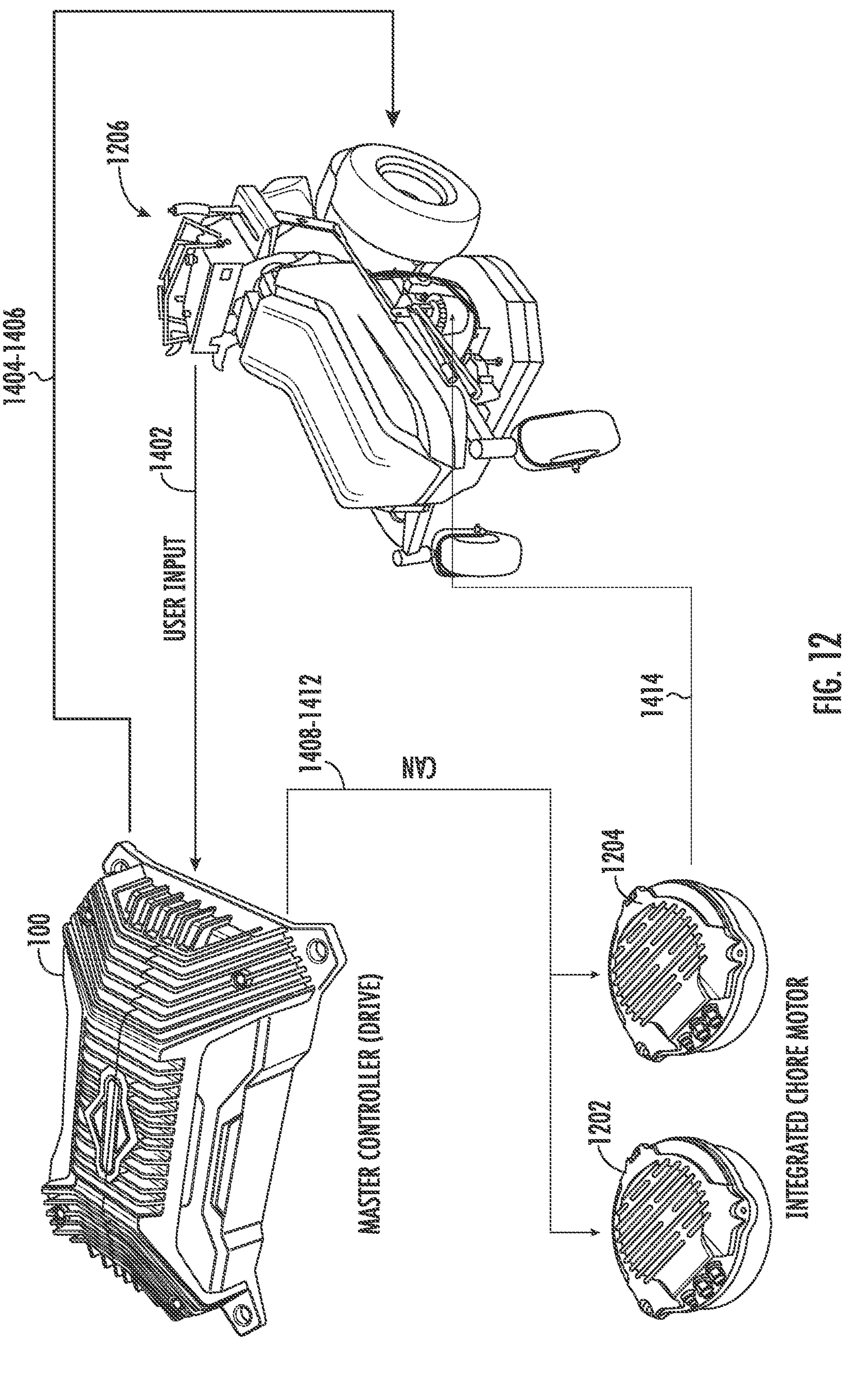
FIG. 12 is a block diagram of the distributed motor controller system of FIG. 10 implemented in a zero turn radius (ZTR) standing lawn mower where the distributed controller system includes multiple controller modules, according to an exemplary embodiment.

Referring now to FIG. 12, a standing ZTR lawnmower 1206 is shown, according to an exemplary embodiment. The ZTR lawnmower 1206 can be the same as and/or similar to the outdoor power equipment 1000. Furthermore, the ZTR lawnmower 808 can have two drive wheels and a drive motor for each drive wheel and two lawn mower blades and a lawn mower blade motor for each of the lawn mower blades. The ZTR lawnmower 1206 is shown to include the controller module 100 and two chore modules 1202 and 1204. The chore modules 1202 and 1204 can be a combination (integration) of a motor controller and a motor (and/or battery) that can be coupled with the motor controller module 100 via the bus 1018. One of the controllers of the controller module 100 can receive user input via a user input device of the ZTR lawnmower 1206 and operate one of the drive wheels of the ZTR lawnmower 1206 based on the user input. The controller can communicate (via the bus 1018) the user input (or another drive command based on the user input) to a second controller of the controller module 100. The second controller can be configured to operate a second drive motor of the ZTR lawnmower 1206 based on the communicated user input (or drive command).

The controller that receives the user input can communicate a command to operate the lawn mower blades to the chore modules 1202 and 1204 via the bus 1018. In some embodiments, the communicated command is the user input received from the user. In some embodiments, the communicated command is a motor speed for the chore modules 1202 and/or 1204 determined by the controller of the controller module 100 based on the user input. Each of the chore motor modules 1202 and 1204 can operate a motor of the chore motor modules 1202 and 1204 to operate the blades of the lawn mower 1206.

Figure 13:
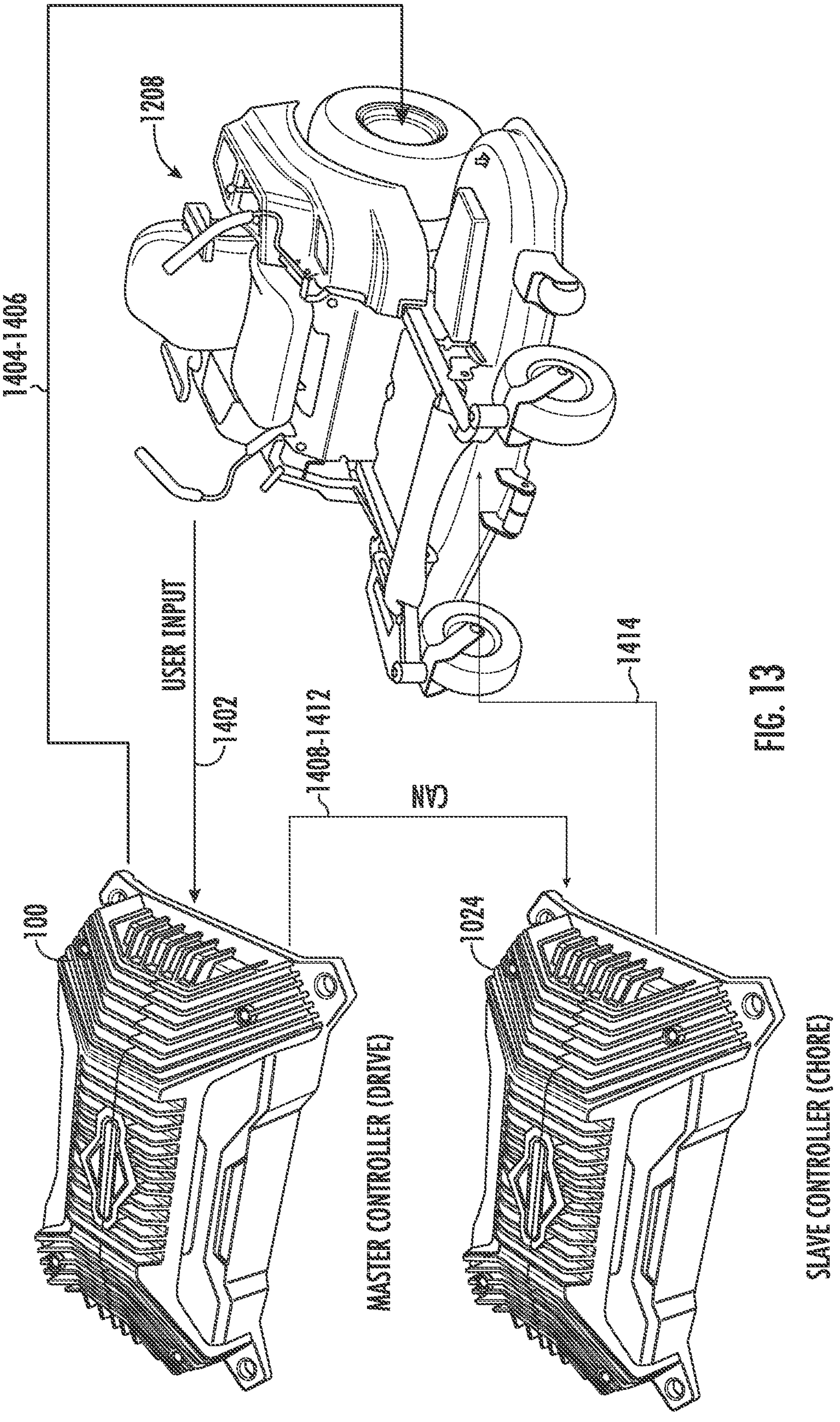
FIG. 13 is a block diagram of the distributed motor controller system of FIG. 10 implemented in a ZTR sitting lawn mower where the distributed controller system includes multiple controller modules, according to an exemplary embodiment.

Referring now to FIG. 13, a sitting ZTR lawn mower 1208 is shown, according to an exemplary embodiment. The ZTR lawn mower 1208 can include two drive wheels and two corresponding drive motors for the drive wheels. Furthermore, the lawn mower can include three lawn mower blades and three lawn mower blade motors for each of the lawn mower blades. The controller module 100 can receive, via one of its controllers, user input for driving the ZTR lawnmower 1208 and/or operating the lawn mower blades.

The controller receiving the user input can be configured to operate one or both of the drive motors of the ZTR lawnmower 1208 based on the user input. In some embodiments, the controller communicates the user input and/or another drive command (e.g., motor speed) to another controller of the controller module 100 and that controller can control the other drive motor of the ZTR lawnmower 1208. Furthermore, the controller that receives the user input can further communicate to controllers of the controller module 1024. The controller of the controller module 100 can communicate (via the bus 1018) a command (e.g., a motor speed, an indication of a user input) to control the blade motors of the ZTR lawnmower 1208.

Referring generally to FIGS. 12-13, the steps of a process 1400 for operating the outdoor power equipment 1000 (e.g., the ZTR lawnmower 1206 and/or the ZTR lawnmower 1208) are shown. These steps are further described with reference to FIG. 14.

Figure 14:
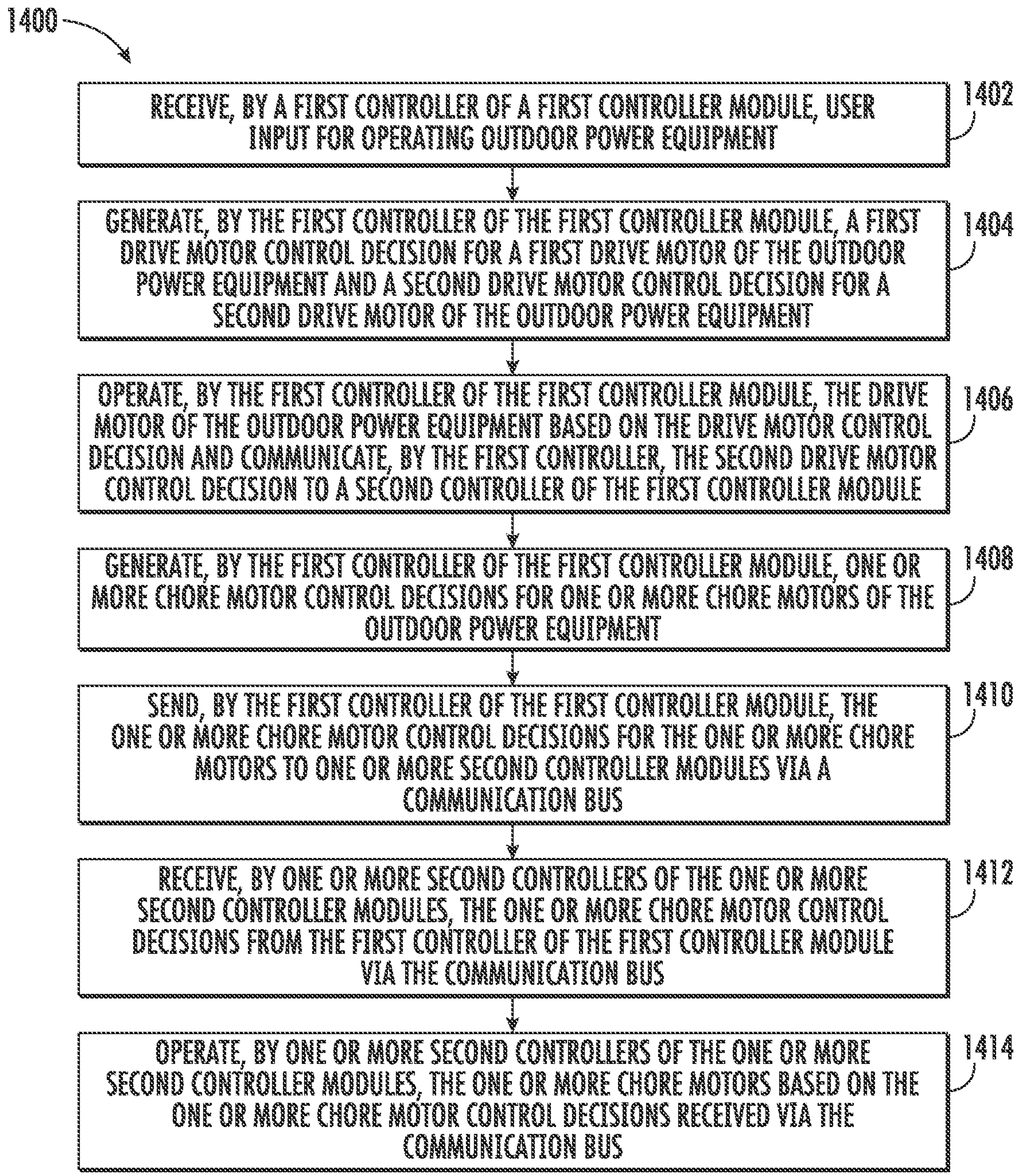
FIG. 14 is a flow diagram of a process for operating the distributed controller systems of FIGS. 12 and 13 where the distributed controller systems include multiple controller modules, according to an exemplary embodiment.

Referring now to FIG. 14, the process 1400 is shown for operating the outdoor power equipment 1000 with multiple controller modules, according to an exemplary embodiment. The controller module 100, the controller module 1024, the controllers 304-308, the controllers 1032-1036, and/or any other computing device or component as described herein can be configured to perform the process 1400.

In step 1402, a first controller of a first controller module can receive a user input for operating outdoor power equipment. The first controller may be the controller 308 and the outdoor power equipment may be the outdoor power equipment 1000 as described with reference to FIG. 11. The user input can be receive by the controller 308 via the user interface 1012.

In step 1404, the controller 308 of the controller module 100 can determine a first motor control decision of a first drive motor of the outdoor power equipment 1000 and a second motor control decision for a second drive motor of the outdoor power equipment 1000. The first motor may be the motor 1006 and can be configured to drive a wheel of the outdoor power equipment 1000 while the second motor may be the motor 1004 configured to drive a second drive wheel of the outdoor power equipment 1000. The motor control decision can cause the motor to be operated forwards or backwards at varying speeds. The speeds may be proportional to, and/or based on, a user input amount.

In step 1406, the controller 308 can operate the motor 1006 based on the first motor control decision and can communicate, via the bus 1018, the second motor control decision to a second controller. The second controller may be the controller 306. The second control decision may be a speed for the motor 1004 but may also be raw user input received from the user interface 1012. The controller 306 can be configured to control the motor 1004 based on the received second motor control decision. In some embodiments, the second motor control decision is the user input received from the user interface 1012. In this regard, the controller 306 can determine the second motor control decision itself.

In step 1408, the controller 308 can generate one or more chore motor control decisions for one or more chore motors of the outdoor power equipment 1000 based on the user input. The one or more chore motors may be the motors 1032-1036. The motor decision may be a speed to operate each of the motors 1032-1036. In step 1410, the controller 308 can communicate the generated chore motor control decisions to the controllers 1026-1030 via the bus 1018.

In step 1412, each of the controllers 1026-1030 can receive the generated chore motor control decision (or each can receive a specific generated chore motor control decision) via the bus 1018. In step 1414, each of the controller 1026-1030 can operate the motors 1032-1036 based on the received generate chore motor control decision. For example, the controller 1026 can receive one chore motor control decision via the bus 1018 from the controller 308 and operate the motor 1032 based on the received chore motor control decision. The controller 1028 can receive another chore motor control decision from the controller 308 via the bus 1018 and operate the motor 1034 based on the other chore motor control decision.

Figure 15:
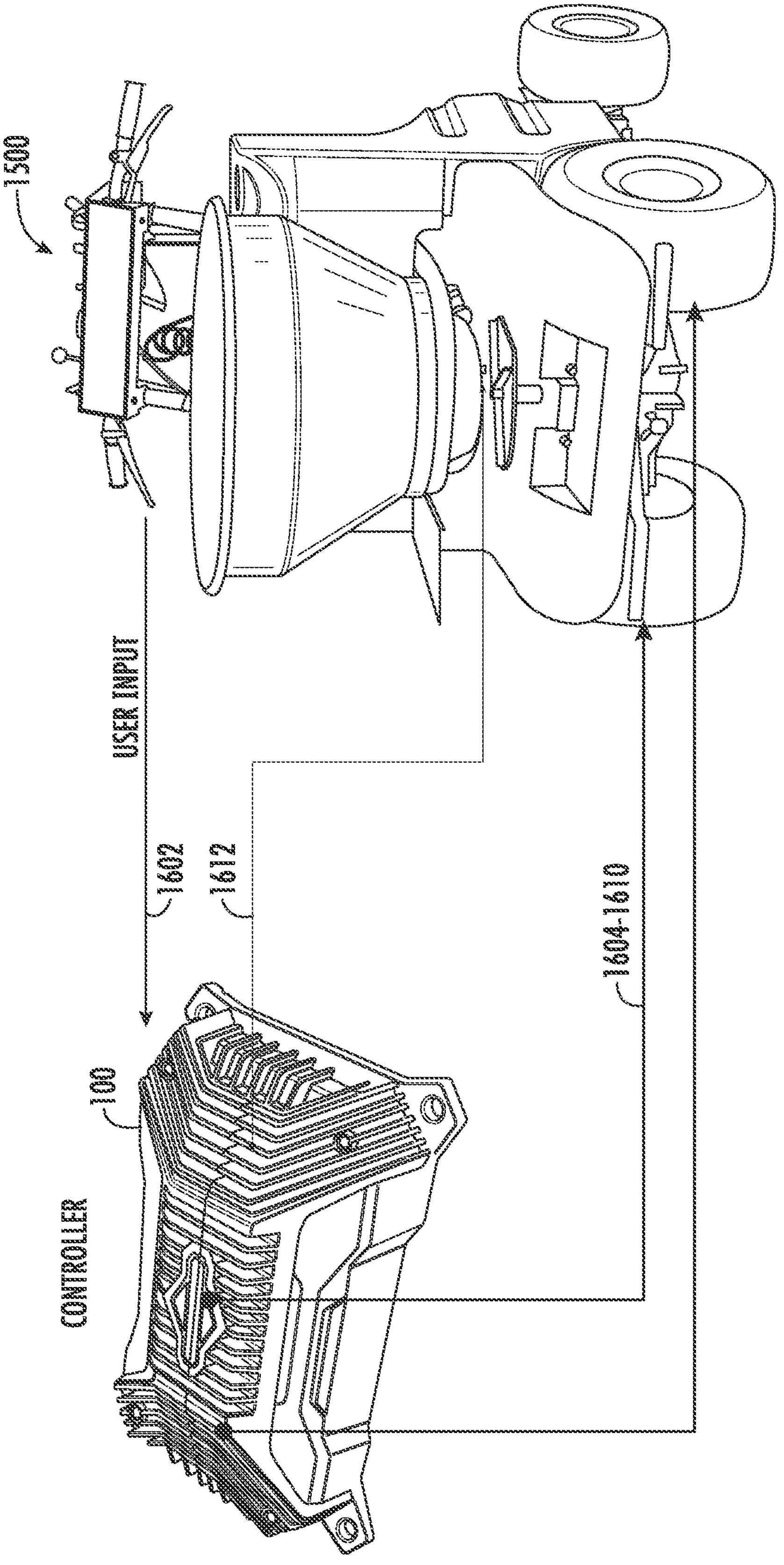
FIG. 15 is a block diagram of the distributed controller system of FIG. 10 implemented in a spreader where the distributed controller system includes a single controller module, according to an exemplary embodiment.

Referring now to FIG. 15, a spreader 1500 is shown for spreading particles (e.g., fertilizer, seed, salt, etc.). The spreader 1500 can be the same as and/or similar to the outdoor power equipment 1000. The spreader 1500 is shown to include only one controller module, the controller module 100. The controller module 100 includes controllers 304-308. The controller 308 can be configured to operate one drive wheel of the spreader 1500, the controller 306 can operate the other drive wheel of the spreader 1500, and the controller 304 can operate the spreader that distributes the particles. FIG. 15 includes the steps of a process 1600 as described with reference to FIG. 16. While the process 1600 can be performed by any piece of outdoor power equipment, the process 1600 can be performed for outdoor power equipment that includes two drive motors and one chore motor. In this regard, only one controller module is necessary to operate the outdoor power equipment. Another example of outdoor power equipment that may only require one controller module is a snow thrower (one auger, two drive wheels).

Figure 16:
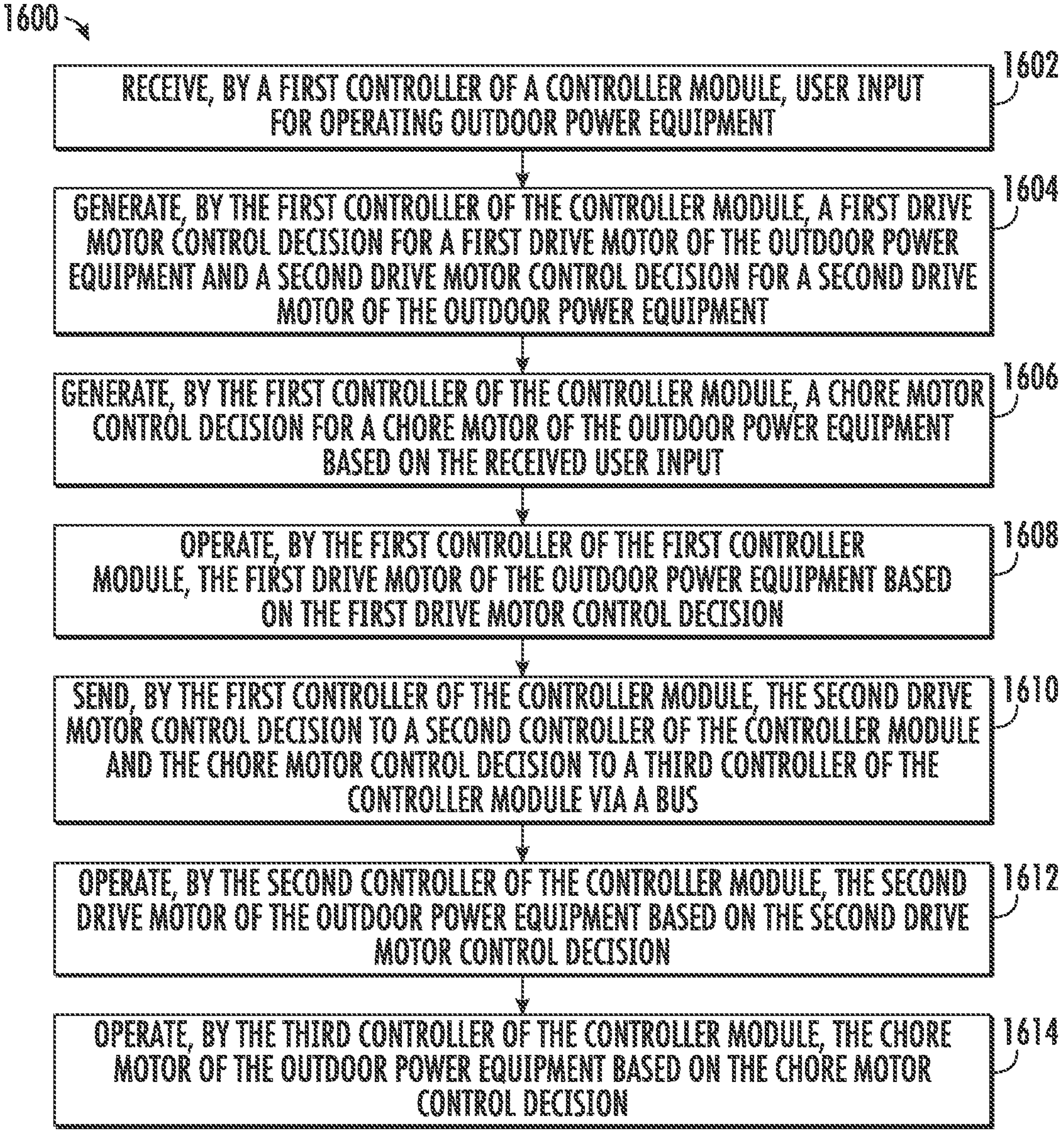
FIG. 16 is a flow diagram for operating the distributed controller system of FIG. 15 where the distributed controller system includes a single controller module, according to an exemplary embodiment.

Referring now to FIG. 16, the process 1600 for operating the outdoor power equipment 1000 with a single controller module is shown, according to an exemplary embodiment. The controller module 100, the controller module 1024, the controllers 304-308, the controllers 1032-1036, and/or any other computing device or component as described herein can be configured to perform the process 1600.

In step 1602, a first controller of a controller module can receive user input for operating outdoor power equipment. The first controller may be the controller 308, the controller module may be the controller module 100, and the outdoor power equipment maybe the outdoor power equipment 1000. The user input may be received from the user interface 1012 and may be an indication to drive the outdoor power equipment 1000 forward, turn left or right, and/or operate a chore motor (e.g., a spreader motor, a lawnmower blade motor, a snow thrower auger motor, etc.) at a particular speed.

In step 1604, based on the user input, the controller 308 can generate a first drive motor control decision and a second drive motor control decision for a first drive motor and a second drive motor of the outdoor power equipment 1000 based on the received user input of the step 1602. The first drive motor may be the motor 1006 while the second drive motor may be the motor 1004. The drive motor control decisions may be decisions to spin drive motors of the outdoor power equipment 1000 forward and/or backward at various speeds.

In step 1606, the controller 308 can generate a chore motor control decision for a chore motor of the outdoor power equipment 1000 based on the received user input of the step 1602. The chore motor may be the motor 1002. The motor 1002 may be configured to operate a lawn mower blade, a spreader, a snow thrower auger, etc. In some embodiments, the chore motor control decision is a decision to operate the chore motor 1002 at a particular speed and/or in a particular direction.

In step 1608, the controller 308 can operate the first drive motor, the motor 1006, based on the first drive motor control decision. In step 1610, the controller 308 can communicate the second drive motor control decision to the controller 306 via the bus 1018. Furthermore, the controller 308 can communicate the chore motor control decision to the controller 304 via the bus 1018.

In step 1612, the controller 306 can operate the drive motor 1004 to drive the outdoor power equipment 1000 based on the first drive motor control decision communicated to the controller 306 via the bus 1018 by the controller 308. In step 1614, the controller 304 can operate the chore motor 1002 based on the chore motor control decision communicated to the controller 304 via the bus 1018 by the controller 308.

Figure 17:
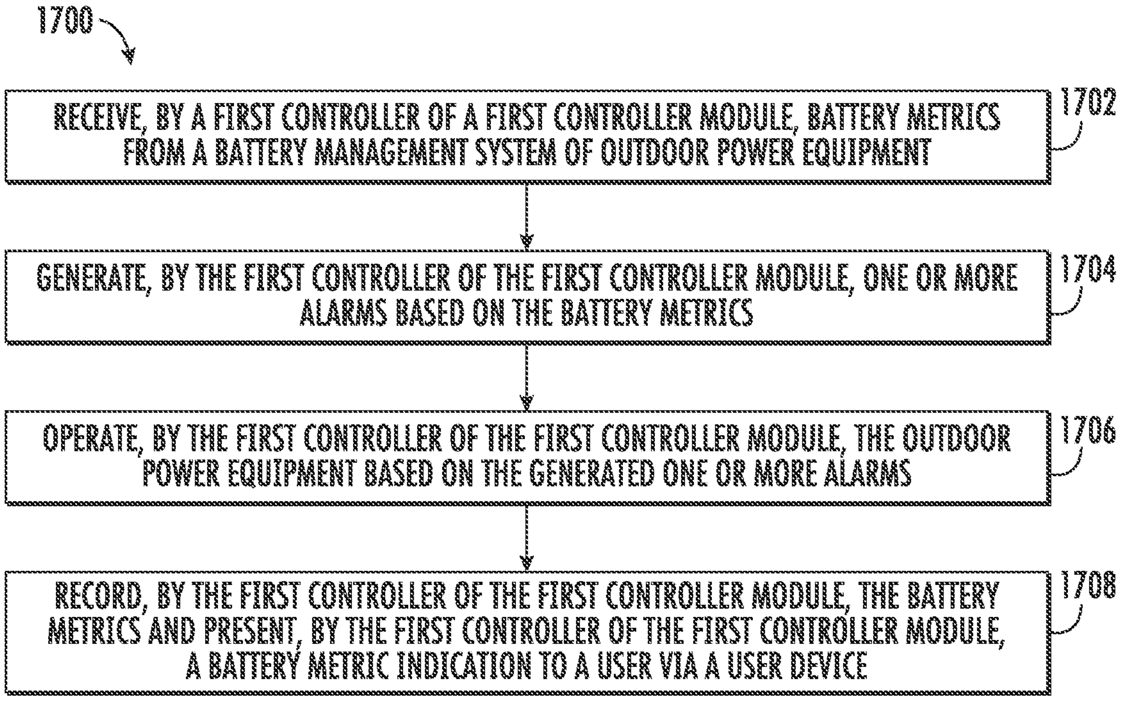
FIG. 17 is a flow diagram of a process for monitoring a battery status of a battery by the distributed controller system of FIG. 10, according to an exemplary embodiment.

Referring now to FIG. 17 a process 1700 is shown for monitoring the status of a battery of the outdoor power equipment 1000, according to an exemplary embodiment. The controller module 100, the controller module 1024, the controllers 304-308, the controllers 1032-1036, and/or any other computing device or component as described herein can be configured to perform the process 1600. However, the process 1700 is described with reference to the controller 308.

In step 1702, the controller 308 can receiver one or more battery metrics from the battery management system 1022. The battery metrics can be discharge current, battery voltage, state of charge, etc. The battery metrics can be received via direct communication and/or via the bus 1018.

In step 1704, the controller 308 can determine, based on the battery metrics whether the battery and/or motor are operating correctly. For example, the controller 308 can compare the battery metrics to various thresholds, e.g., max output currents, max temperatures, etc. In some embodiments, various alarm levels can be generated. For example, if the temperature is greater than a first predefined amount but less than a second predefined amount, the alarm level may be one. However, if the temperature is greater than the second predefined amount, the alarm level may be two. Furthermore, if one of the battery metrics received from the battery management system 1022 is indicative of a battery fault, the controller 308 can generate an alarm. Based on the alarm, in step 1706, the controller 308 can operate the outdoor power equipment 1000. For example, the controller 308 can turn off a motor (e.g., drive motor, chore motor, etc.) associated with the battery (or apply a brake) and/or can communicate to other controllers to stop using the battery, turn off partially (operate at low speeds), and/or turn off completely.

In step 1708, based on the battery metrics, the controller 308 can generate a battery metric indication and cause a user device, e.g., the user interface 1012, to present the user with an indication of the battery metrics. In some embodiments, the controller 308 can generate a battery metric indication, e.g., runtime to empty, miles to empty, battery charge amount, etc. which can indicate to the user the current state of their battery. In some embodiments, the controller 308 can present the alarm generated in the step 1704 and present the user with an indication of the alarm to help the user perform trouble shooting of the outdoor power equipment 1000.

Figure 18:
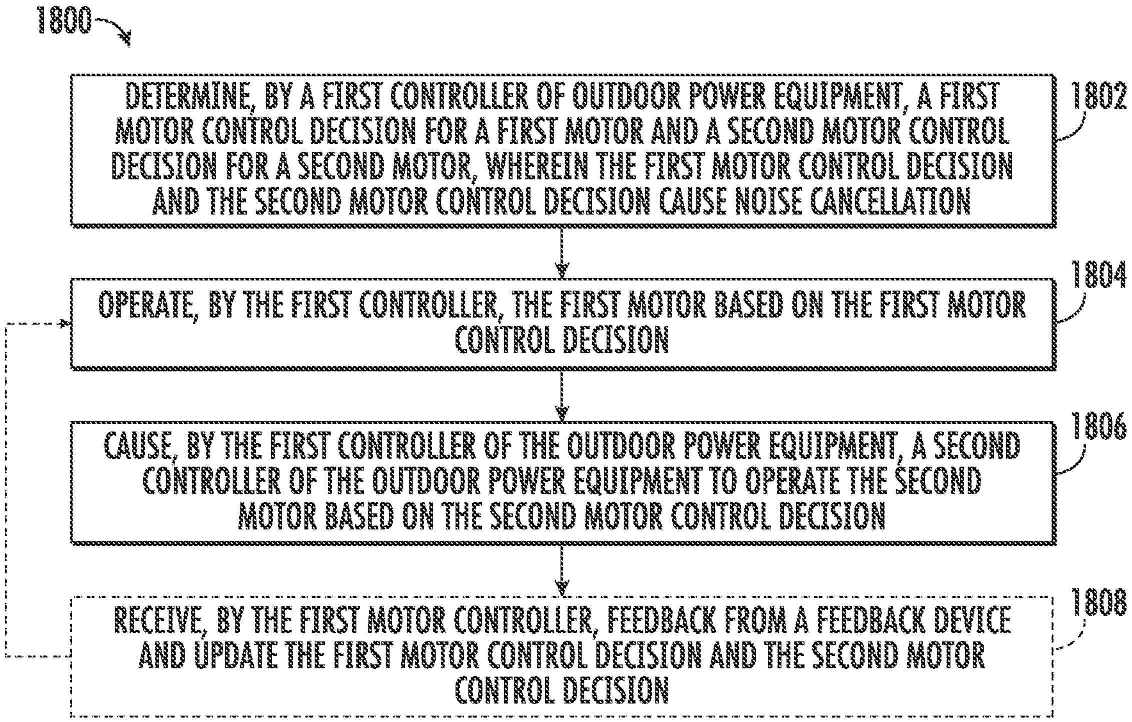
FIG. 18 is a flow diagram of a process for performing noise cancellation with destructive waves for two motors that can be performed by the distributed controller system of FIG. 10, according to an exemplary embodiment.

Referring now to FIG. 18, a process 1800 is shown for reducing noise of the outdoor power equipment 1000 caused by motors of the outdoor power equipment 1000 operating, according to an exemplary embodiment. The controller module 100, the controller module 1024, the controllers 304-308, the controllers 1032-1036, and/or any other computing device or component as described herein can be configured to perform the process 1600. However, the process 1800 is described with reference to the controller 308.

In step 1802, the controller 308 can determine a first motor control decision for a first motor and a second motor control decision for a second motor such that the operating a first motor at the first motor control decision and the second motor at the second motor control decision causes noise cancellation. For example, if the outdoor power equipment 1000 is a lawnmower that includes two lawnmower blades operated by two motors, the speeds and/or timing can be set by the controller 308 such that the noise produced by each of the lawnmower blades and/or motors cancels out. The first motor control decision and the second motor control decision can cause two sound waves to be generated such that one wave has an inverted phase (an antiphase) of the other wave, causing cancellation of the waves. In some embodiments, the first control decision and the second control decision are based on user input and/or a determined speed for the motors. For example, the user input and/or determined speed may indicate a speed that both of the motors should operate at. However, the first control decision and the second control decision may deviate from the indicated speed such that the motors operate close to the desired speed but with reduced noise. For example, if the motors could operate a predefined speed, the first control decision and the second control decision may be to operate one motor at the predefined speed and offset the second motor from the predefined speed by a particular amount. For example, the motors can be kept 100 RPM apart. In some embodiments, one of the controllers stores a lookup table of speed correspondences between two motors and/or offsets such that for a determination for a speed of one motor, a corresponding speed for a second motor for speed reduction can be retrieved from the lookup table by the controller. The selection of the motor speeds can be open loop and/or closed loop based on feedback sensors.

In some embodiments, the controller 308 communicates with a feedback device, for example, an accelerometer, a microphone, etc. Based on the feedback from the feedback device, the controller 308 can be configured to perform a tuning cycle to identify the first motor control decision and the second motor control decision. For example, the controller 308 can run through multiple different settings to generate values for motor speeds and/or timing (e.g., based on hall effect sensors for the motors). In some embodiments, a user can interact with a button causing the controller 308 to perform the tuning cycle and identify the first motor control decision and the second motor control decision. This tuning process can account for changes to the outdoor power equipment 1000 over time as the outdoor power equipment ages. In some embodiments, the controller 308 can identify the resonant frequencies of the outdoor power equipment 1000 by performing a frequency sweep and identifying the resonant frequencies of the outdoor power equipment 1000. These resonant frequencies can be utilized in performing noise reduction.

In steps 1804 and 1806, the controller 308 can operate the first motor and the second motor based on the first motor control decision and the second motor control decision. In some embodiments, the controller 308 operates both motors directly, or only one of the motors. In some embodiments, the controller 308 does not directly operate either of the motors. The controller 308 can communicate the first control decision and/or the second control decision to one or more other controller that via the bus 1018. Each controller can operate a motor (or motors) based on the first control decision and/or the second control decision.

In step 1808, the controller 308 can receive feedback from the feedback device and update the first motor control decision and the second motor control decisions of the step 1802. In this regard, a noise cancellation loop (e.g., a proportional integral derivative (PID) loop) can be implemented to continuously tune and reduce the noise caused by the two motors based on the feedback.

Figure 19:
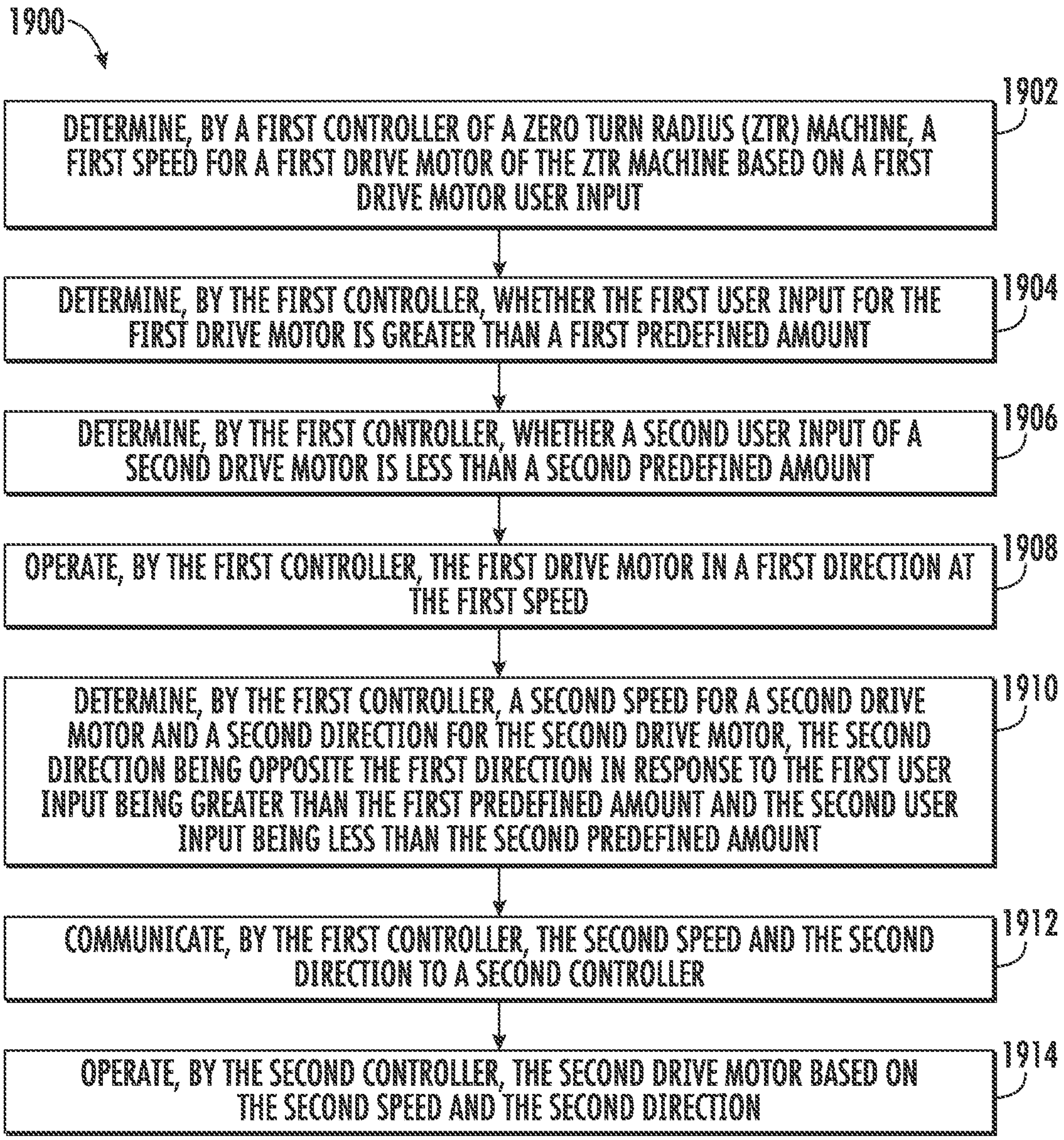
FIG. 19 is a flow diagram of a process for performing a turn on a ZTR with the distributed controller system of FIG. 10, according to an exemplary embodiment.

Referring now to FIG. 19, a process 1900 is shown for turning a ZTR machine, according to an exemplary embodiment. The controller module 100, the controller module 1024, the controllers 304-308, the controllers 1032-1036, and/or any other computing device or component as described herein can be configured to perform the process 1600. However, the process 1900 is described with reference to the controller 308 and the controller 306.

In step 1902, the controller 308 can receive a user input for a first drive motor of the ZTR machine and determine a first speed for the first drive motor of the ZTR. In step 1904, the controller 308 can determine whether the first user input of the first drive motor is greater than a first predefined amount. This can indicate whether or not the user is trying to cause the ZTR machine to make a sharp turn (a rotation). However, if the user is indicating that both drive motors should be driven at a speed greater than the first predefined amount, this would indicate that rather than turning, the user wants the ZTR machine to drive at a fast speed. Therefore, in step 1906, the controller 308 can determine whether a second user input of a second drive motor is less than a predefined amount. This indicates that the user wants the ZTR machine to spin.

In some embodiments, the user inputs can be compared to the first predefined amount and the second predefined amount based on a value assigned indicating drive motor direction. For example, if forward user inputs range from 0 to 100 and reverse user inputs range from 0 to −100, rather than comparing the user inputs to the first predefined amount and the second predefined amount, the absolute values of the user inputs can be compared to the first predefined amount and the second predefined amount. In this regard, if a user pushes forward on a right drive stick but not on a left drive stick, it can be identified that the user is attempting to rotate the ZTR machine to the left and the left wheel should spin backwards to aid in the spin. However, if the user pulls back on the right drive stick but not on the left drive stick, it can be identified that the user is attempting to rotate the ZTR machine to the right and the left wheel should spin forward to aid in the spin.

In step 1908, the controller 308 can operate a first drive motor of the ZTR machine in a first direction based on the first user input. The controller 308 can operate the first drive motor at a particular speed and in a particular direction indicated by the first user input.

In step 1910, the controller 308 can determine a second speed for the second drive motor and a second direction for the second drive motor in response to determining that the first user input is greater than the first predefined amount and the second user input is less than the second predefined amount. The second direction may be opposite the first direction of the first drive motor. This can cause the motors to work together to spin or turn the ZTR machine since the motors are operating in different directions. The second speed can be set to a predefined stored turning amount. The turning speed may be an ideal speed to operate the second drive motor at to cause the ZTR machine to turn and/or spin. In some embodiments, the speed is determined by the controller 308 to be proportional to the speed of the first drive motor.

In step 1912, the controller 308 can communicate the second speed and the second direction to the controller 306 via the bus 1018. In response to receiving the second speed and the second direction, the controller 306 can control the second rive motor in step 1914.

Figure 20:
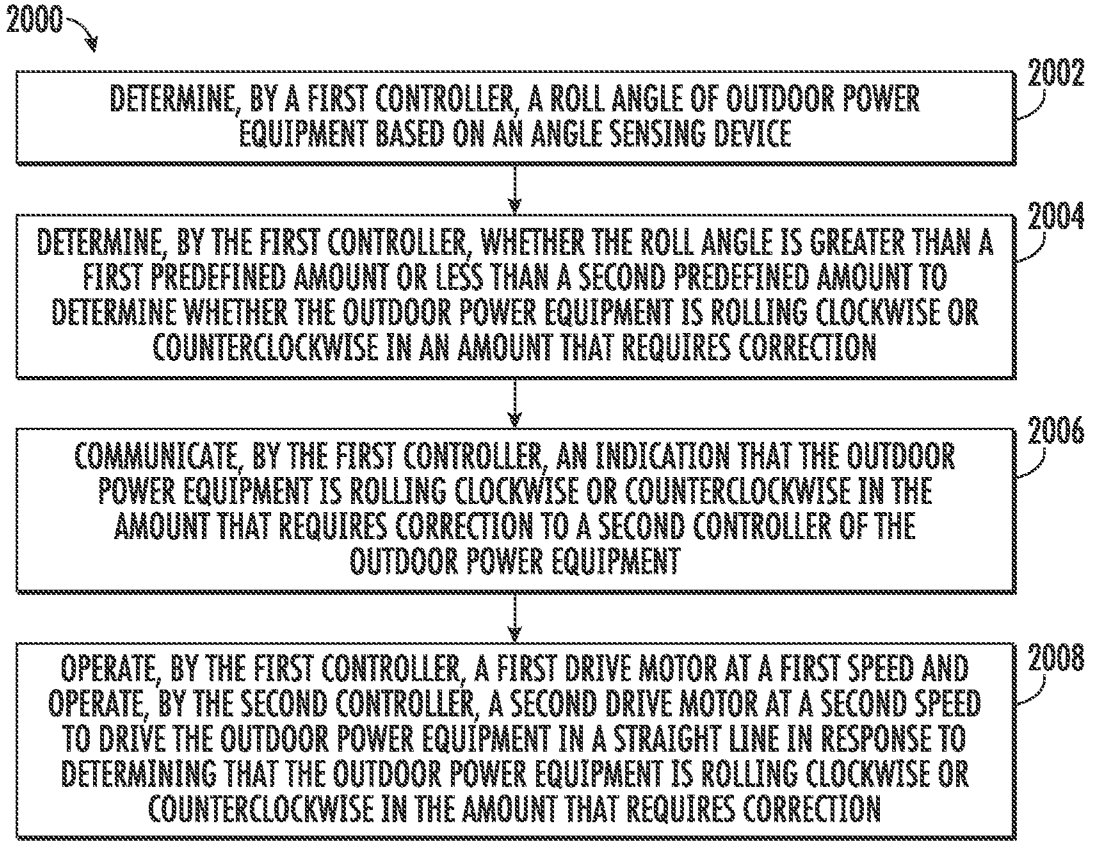
FIG. 20 is a flow diagram of a process for correcting for tilt in outdoor power equipment that can be performed by the distributed controller system of FIG. 10, according to an exemplary embodiment.

Referring now to FIG. 20, a process 2000 for driving the outdoor power equipment 1000 in a straight line when the outdoor power equipment 1000 is driving on an incline is shown, according to an exemplary embodiment. The controller module 100, the controller module 1024, the controllers 304-308, the controllers 1032-1036, and/or any other computing device or component as described herein can be configured to perform the process 1600. However, the process 2000 is described with reference to the controller 308.

In step 2002, the controller 308 can receive a roll angle for the outdoor power equipment 1000 from an angle sensing device. The roll angle may indicate how much the outdoor power equipment 1000 is rolling, identifying whether the outdoor power equipment 1000 is driving across the side of a hill. In step 2004, the controller 308 can determine whether the roll angle is greater than a first predefined amount or less than a second predefined amount. By comparing the roll angle to two predefined amounts, the controller 308 can determine which direction the outdoor power equipment 1000 is rolling, e.g., clockwise or counterclockwise. If the outdoor power equipment 1000 is rolling clockwise, a right drive wheel can be operated at a speed greater than a left drive wheel to keep the outdoor power equipment 1000 driving straight. If the outdoor power equipment 1000 is rolling counterclockwise, the left wheel can be operated at a speed greater than the right wheel to keep the outdoor power equipment 1000 driving straight.

Figure 21:
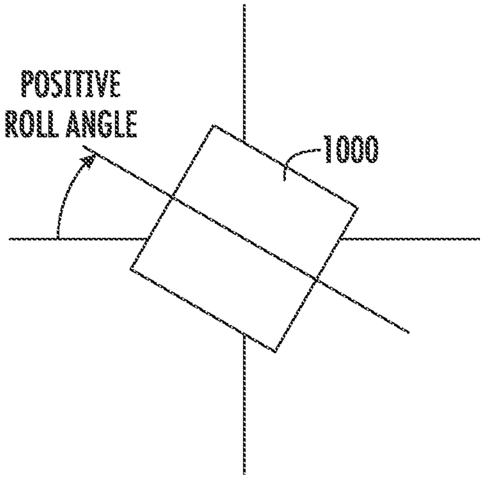
FIGS. 21 and 22 illustrate outdoor power equipment rolling clockwise and counterclockwise, according to an exemplary embodiment.
Figure 22:
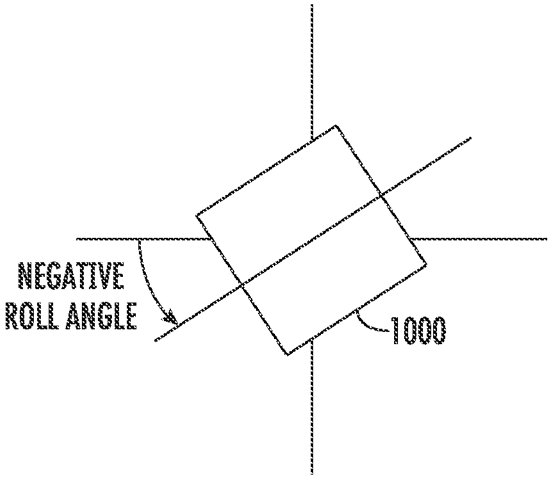

Comparing the roll angle to determine whether the roll angle is greater than a first predefined mount and less than a second predefined amount assumes that the roll angle is either positive or negative (positive for one direction from an axis of reference and negative from a second direction from the axis of reference). Roll angles that are either positive or negative are illustrated for the outdoor power equipment 1000 in FIGS. 21 and 22. However, alternatively, the roll angle may be expressed only as a positive value and not a negative value. If the roll angle is only positive, the roll angle can be compared to determine whether the roll angle is greater than a first predefined amount but not the second predefined amount or greater than the first predefined amount and the second defined amount. This can indicate whether the outdoor power equipment 1000 is rolling clockwise or counterclockwise.

In step 2006, the controller 308 can communicate an indication that the roll angle is clockwise or counterclockwise (or greater than the first predefined amount or less than the second predefined amount) to the controller 306 via the bus 1018. In step 2008, the controller 308 can operate the first drive motor at a first speed and the second drive motor can operate the second drive motor at a second speed such that the speeds are offset to keep the outdoor power equipment 1000 driving in a straight line even though the outdoor power equipment is rotating clockwise or counterclockwise.

For example, if the it has been determined by the first controller that the outdoor power equipment 1000 is rotated clockwise in an amount that requires correction, the first controller can operate the motor (left motor) in an amount based on a user input and the second controller can determine the second speed for the second motor (right motor) to be the first speed plus a predefined offset. The predefined offset may be based on the roll angle. This can enable the outdoor power equipment 1000 to drive in a straight line even though it is rolled clockwise. In some embodiments, the first controller and the second controller only perform the roll correction if user inputs for the first drive motor and the second drive motor are within a predefined amount from each other, this may indicate that the user wishes to drive the outdoor power equipment 1000 in a straight line.

In some embodiments, rather, or in addition to, the first controller operating the left motor at a first speed based on user input and the second controller operating the right motor to be the first speed plus a predefined offset, the first motor controller can operate the left motor to be an amount based on the user input minus a predefined offset. In this regard, rather than, or in addition to, the first controller communicating with the second controller (or the second controller receiving the roll information itself), the first controller can itself, slow down the left motor to perform roll correction. In some embodiments, the first controller slows down the left motor by a predefined amount and the second controller speeds up the right motor by another predefined amount to perform roll correction.

In some embodiments, various amounts of roll may indicate that the outdoor power equipment 1000 is being operated in a dangerous manner. For example, if the outdoor power equipment 1000 is a lawnmower (or other outdoor equipment), it may be dangerous for the outdoor power equipment 1000 to be riding on a sharp incline since there may be the chance that the outdoor power equipment 1000 rolls or flips over and exposes the lawn mower blades. In this regard, the first controller and/or the second controller can determine whether the outdoor power equipment 1000 is in danger by determining whether a roll angle is greater than a first predefined amount. In response to determining that the roll angle is greater than the first predefined amount, the first controller and/or the second controller can turn off lawn mower blade motors (or cause other controllers to turn off lawn mower blade motors). However, the first controller and/or the second controller may continue to operate (or allow other controllers to operate) the drive motors so that the operator of the outdoor power equipment 1000 can correct the dangerous situation.

If the first controller and/or the second controller determine that the roll angle is greater than both the first predefined and a second predefined amount greater than the first predefined amount, this may indicate that the outdoor power equipment 1000 is flipping or rolling, has flipped or rolled, or is very likely to flip or roll. In this regard, the motor controllers of the outdoor power equipment 1000 can be configured to shut down all motors and/or apply braking devices.

Figure 23:
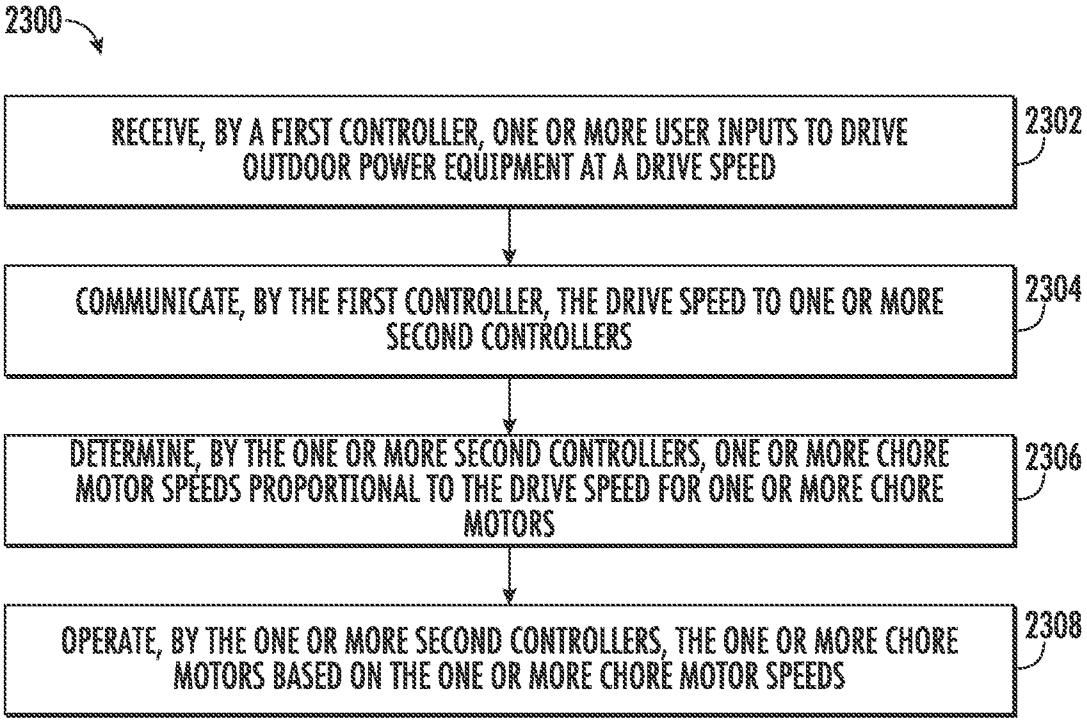
FIG. 23 is a flow diagram of a process for operating a chore motor at a speed proportional to a drive motor speed to save energy, the process can be performed by the distributed motor controller system of FIG. 10, according to an exemplary embodiment.

Referring now to FIG. 23, a process 2300 is shown for operating a chore motor at a speed proportional to a drive speed for the outdoor power equipment 1000, according to an exemplary embodiment. The controller module 100, the controller module 1024, the controllers 304-308, the controllers 1032-1036, and/or any other computing device or component as described herein can be configured to perform the process 1600. However, the process 2300 is described with reference to the controller 308 and the controller 306.

In step 2302, the controller 308 can receive one or more drive inputs for the outdoor power equipment 1000 to drive the outdoor power equipment 1000 at a particular speed. The drive inputs may indicate a user defined drive speed for a first drive wheel and a second drive wheel. The controller 308 and/or multiple other controllers, can operate drive motors to drive the outdoor power equipment 1000—based on the user defined drive speed. In step 2304, the controller 308 can communicate the drive speed to the controller 306 via the bus 1018.

In step 2306, the controller 306 can determine one or more chore motor speeds for a chore motor, the chore motor speeds being proportional to the drive speed. In this regard, the speed of a chore device, e.g., a lawnmower blade, a spreader, can be proportional to how fast the outdoor power equipment 1000 is moving. By adjusting the speed of the chore device, energy can be saved. If the outdoor power equipment 1000 is a lawnmower and the lawnmower is stationary or moving slowly, it is a waste of energy to operate the lawnmower blade at a high speed. However, if the lawnmower is moving quickly, the lawnmower blade may need to operate at the high speed to efficiently cut grass. In this regard, the speed of the chore motor can be based on the drive speed for the outdoor power equipment 1000. In the step 2308, the controllers 306 can operate one or more chore motors at the one or more chore motor speeds determined in the step 2306.

The various control systems and circuits described herein (including in the related applications incorporated by reference) may be implemented as "non-programmable circuitry" that consists of analog or digital hard circuitry that does not utilize a microcontroller or software or as a controller, microcontroller, computer, or other programmable device. It is believed that embodiments in which the controls are implemented as non-programmable circuitry including discrete components may be less expensive than embodiments implemented with microcontrollers or using software. Such non-programmable circuitry embodiments do not include a microcontroller. The various control systems and circuits described herein (including in the related applications incorporated by reference) may be implanted as a component of a battery, as a component of a battery receiver or receiving port, as a component of the engine, as a component of a starter module separate from the engine, and/or as a component of the outdoor power equipment.

The construction and arrangements of the starter system for an engine, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. Outdoor power equipment comprising:

a left drive motor configured to operate a left drive wheel on a left side of the outdoor power equipment;

a right drive motor configured to operate a right drive wheel on a right side of the outdoor power equipment;

a sensor configured to detect an incline of a surface over which the outdoor power equipment is travelling;

at least one drive motor controller communicatively coupled to the sensor and configured to control the left drive motor and the right drive motor, the at least one drive motor controller configured to:

receive the detected incline from the sensor;

determine a roll angle of the outdoor power equipment based on the detected incline; and operate the left drive motor at a left drive speed and the right drive motor at a right drive speed based on the roll angle; and a user input device communicatively coupled to the at least one drive motor controller and configured to receive a user input indicating a direction of travel, wherein when the direction of travel is a line and the roll angle exceeds a predetermined threshold, the at least one drive motor controller is configured to operate the left drive motor and the right drive motor such that the left drive speed is different than the right drive speed.

2. The outdoor power equipment of claim 1, wherein at least one motor drive controller includes a left drive motor controller configured to control the left drive motor and a right drive motor controller configured to control the right drive motor.

3. The outdoor power equipment of claim 1, wherein the sensor comprises an accelerometer or a gyroscope.

4. The outdoor power equipment of claim 1, wherein when the roll angle indicates a counterclockwise roll, the at least one drive motor controller is configured to operate the left drive motor and the right drive motor such that the left drive speed is higher than the right drive speed, and when the roll angle indicates a clockwise roll, the at least one drive motor controller is configured to operate the left drive motor and the right drive motor such that the left drive speed is lower than the right drive speed.

5. The outdoor power equipment of claim 4, wherein a counterclockwise roll indicates that the left drive wheel is higher on the incline than the right drive wheel, and a clockwise roll indicates that the left drive wheel is lower on the incline than the right drive wheel.

6. The outdoor power equipment of claim 1, wherein when the user input falls within a predetermined deviation threshold of a user input indicating a line direction of travel, the at least one drive motor controller is configured to operate the left and right drive motors such that the outdoor power equipment moves in a line.

7. The outdoor power equipment of claim 6, wherein the user input device includes a steering wheel, the user input indicating a line direction of travel corresponds to a centered steering wheel position, and the predetermined deviation threshold comprises a range of steering wheel positions that are not the centered steering wheel position.

8. The outdoor power equipment of claim 6, wherein the user input device includes two drive sticks, the user input indicating a line direction of travel corresponds to the two drive sticks receiving the same input, and the predetermined deviation threshold comprises a range of drive stick positions in which the two drive sticks do not receive the same input.

* * * * *